United States Patent
Osada

(10) Patent No.: US 8,461,442 B2
(45) Date of Patent: *Jun. 11, 2013

(54) COMPUTER-READABLE STORAGE MEDIUM HAVING MUSIC PLAYING PROGRAM STORED THEREIN AND MUSIC PLAYING APPARATUS

(75) Inventor: Junya Osada, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/118,780

(22) Filed: May 31, 2011

(65) Prior Publication Data

US 2011/0226117 A1    Sep. 22, 2011

Related U.S. Application Data

(63) Continuation of application No. 12/149,599, filed on May 5, 2008, now Pat. No. 7,994,411.

(30) Foreign Application Priority Data

Mar. 5, 2008 (JP) .................................. 2008-055263

(51) Int. Cl.
  *G10H 7/00* (2006.01)

(52) U.S. Cl.
  USPC ................................ 84/609; 84/613; 84/645

(58) Field of Classification Search
  USPC ............................................. 84/609, 613, 645
  See application file for complete search history.

(56) References Cited

U.S. PATENT DOCUMENTS

| 6,118,065 | A  | 9/2000 | Haruyama |
| 6,169,243 | B1 | 1/2001 | Ito |
| 6,898,759 | B1 | 5/2005 | Terada et al. |

FOREIGN PATENT DOCUMENTS

| JP | 11-224084 | 8/1999 |
| JP | 2000-242265 | 9/2000 |
| JP | 2000-350861 | 12/2000 |
| JP | 2005-202204 | 7/2005 |
| JP | 2006-072230 | 3/2006 |

*Primary Examiner* — David S. Warren
(74) *Attorney, Agent, or Firm* — Nixon & Vanderhye PC

(57) ABSTRACT

At a time T0, prior read reproduction is started with a volume of 0. Upon starting the prior read reproduction, MIDI events containing note events are sequentially generated. Each time each of the note events is generated, note data is generated based on these note events and sequentially stored in a note pool 123. At a time T1, actual reproduction is started. After the time T1, the actual reproduction and the prior read reproduction are concurrently performed at a same speed. Accordingly, the prior read reproduction precedes invariably two bars ahead of the actual reproduction. Information pertinent to notes contained in a part from a currently played position to a position two bars ahead of the currently played position can be easily obtained from the note pool 123.

18 Claims, 23 Drawing Sheets

F I G. 1
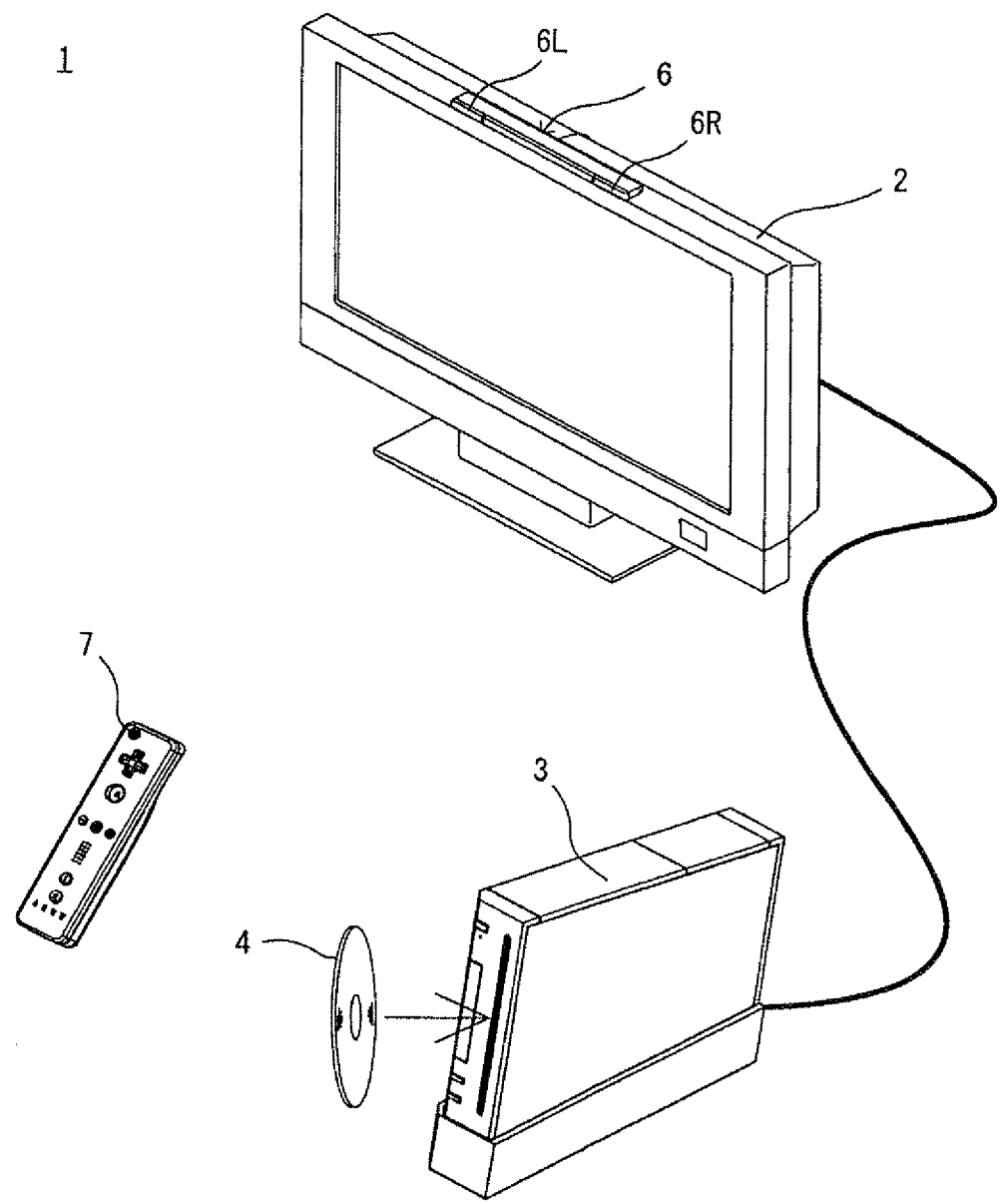

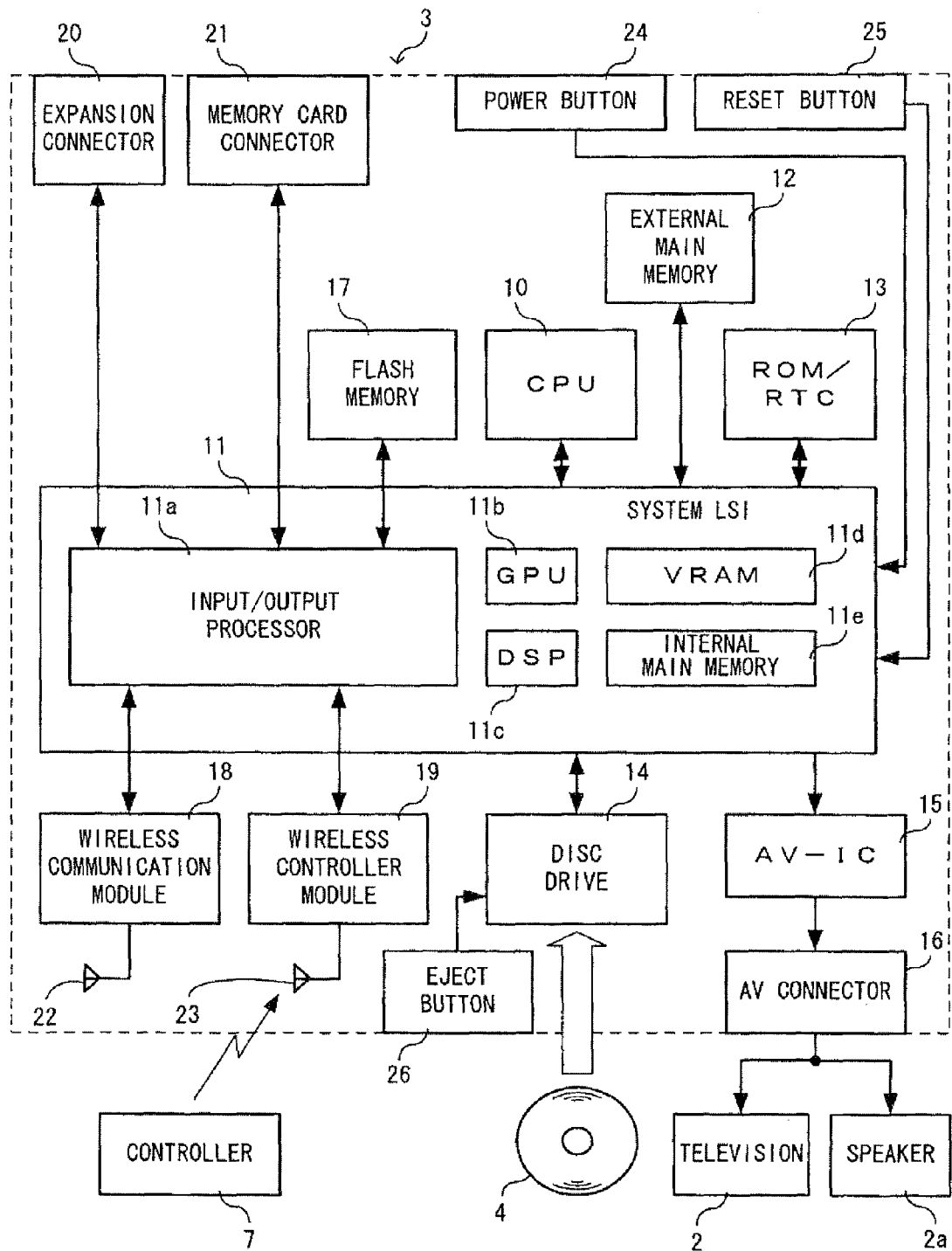
F I G. 2

F I G. 8
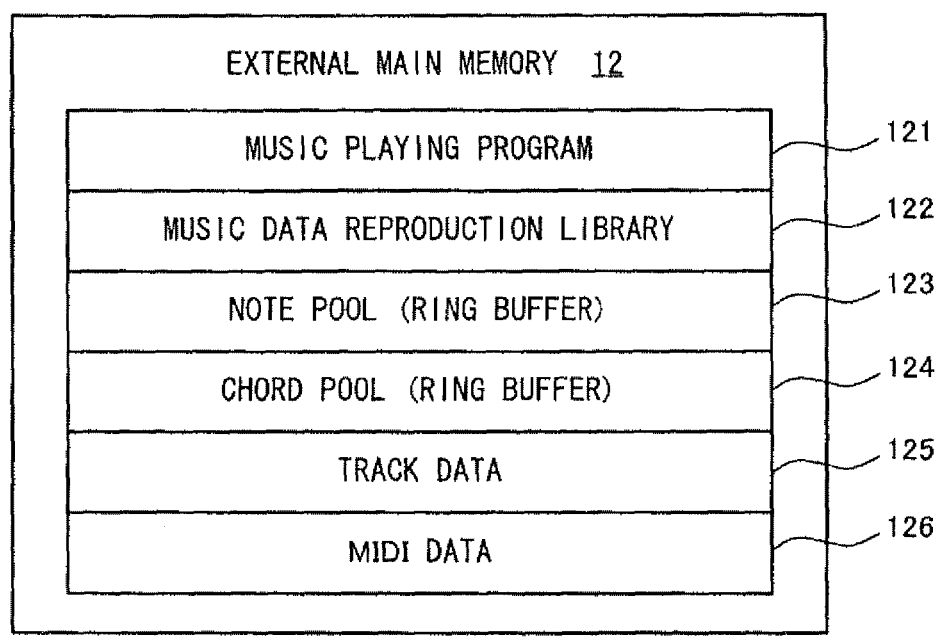

FIG. 9

| MIDI DATA 126 | | | | |
|---|---|---|---|---|
| BELONGING TRACK | REPRODUCTION TIMING [tick] | NOTE LENGTH [tick] | SOUND PITCH | VELOCITY |
| 0 | 0 | 48 | 62 | 100 |
| 0 | 0 | 48 | 65 | 100 |
| 1 | 0 | 96 | 67 | 100 |
| 2 | 0 | 24 | 65 | 100 |
| 2 | 24 | 24 | 67 | 100 |
| 0 | 48 | 48 | 69 | 100 |
| 2 | 48 | 24 | 65 | 100 |
| 2 | 72 | 24 | 67 | 100 |
| 0 | 96 | 96 | 62 | 100 |
| 0 | 96 | 96 | 65 | 100 |
| 1 | 96 | 48 | 64 | 100 |
| 1 | 96 | 48 | 67 | 100 |
| 2 | 96 | 48 | 64 | 100 |
| 1 | 144 | 24 | 64 | 100 |
| 2 | 144 | 48 | 65 | 100 |
| 2 | 144 | 48 | 69 | 100 |
| 1 | 168 | 24 | 65 | 100 |

FIG. 17

| NOTE POOL 123 | | | | | |
|---|---|---|---|---|---|
| NOTE NO. | BELONGING TRACK | REPRODUCTION TIMING [tick] | NOTE LENGTH [tick] | SOUND PITCH | BELONGING CHORD |
| N1 | 0 | 0 | 48 | 62 | W1 |
| N2 | 0 | 0 | 48 | 65 | W1 |
| N3 | 1 | 0 | 96 | 67 | W2 |
| N4 | 2 | 0 | 24 | 65 | W3 |
| N5 | 2 | 24 | 24 | 67 | W4 |
| N6 | 0 | 48 | 48 | 69 | W5 |
| N7 | 2 | 48 | 24 | 65 | W6 |
| N8 | 2 | 72 | 24 | 67 | W7 |
| N9 | 0 | 96 | 96 | 62 | W8 |
| N10 | 0 | 96 | 96 | 65 | W8 |
| N11 | 1 | 96 | 48 | 64 | W9 |
| N12 | 1 | 96 | 48 | 67 | W9 |
| N13 | 2 | 96 | 48 | 64 | W10 |
| N14 | 1 | 144 | 24 | 64 | W11 |
| N15 | 2 | 144 | 48 | 65 | W12 |
| N16 | 2 | 144 | 48 | 69 | W12 |
| N17 | 1 | 168 | 24 | 65 | W13 |

F I G. 1 8

| CHORD POOL 124 | | | | | |
|---|---|---|---|---|---|
| CHORD NO. | BELONGING TRACK | REPRODUCTION TIMING [tick] | NEXT CHORD | PREVIOUS CHORD | COMPOSITION NOTE(S) |
| W1 | 0 | 0 | W5 | NULL | N1, N2 |
| W2 | 1 | 0 | W9 | NULL | N3 |
| W3 | 2 | 0 | W4 | NULL | N4 |
| W4 | 2 | 24 | W6 | W3 | N5 |
| W5 | 0 | 48 | W8 | W1 | N6 |
| W6 | 2 | 48 | W7 | W4 | N7 |
| W7 | 2 | 70 | W10 | W6 | N8 |
| W8 | 0 | 96 | NULL | W5 | N9, N10 |
| W9 | 1 | 96 | W11 | W2 | N11, N12 |
| W10 | 2 | 96 | W12 | W7 | N13 |
| W11 | 1 | 144 | W13 | W9 | N14 |
| W12 | 2 | 144 | NULL | W10 | N15, N16 |
| W13 | 1 | 168 | NULL | W11 | N17 |

F I G. 1 9

| TRACK DATA 125 | |
|---|---|
| TRACK NO. | LATEST CHORD |
| 0 | W8 |
| 1 | W13 |
| 2 | W12 |

COMPUTER-READABLE STORAGE MEDIUM HAVING MUSIC PLAYING PROGRAM STORED THEREIN AND MUSIC PLAYING APPARATUS

CROSS REFERENCE TO RELATED APPLICATION

This application is a continuation of Ser. No. 12/149,599 filed May 5, 2008. The disclosure of Japanese Patent Application No. 2008-055263, filed on Mar. 5, 2008, is incorporated herein by reference.

TECHNICAL FIELD

Example embodiments of the present invention relate to a computer-readable storage medium having a music playing program stored therein and a music playing apparatus and, more particularly, to a computer-readable storage medium having a music playing program stored therein and a music playing apparatus for playing music by reproducing music data containing information pertinent to pitches of notes which music is composed of and reproduction timing information.

BACKGROUND AND SUMMARY

A music staging game machine disclosed in Japanese Laid-Open Patent Publication No. 2000-350861 is a game machine for enabling a player to perform a staging operation according to previously prepared music by using a keyboard and a slide disk. In this music staging game machine, operation timing data and automatic playing timing data are prepared as data to be reproduced for playing music. The operation timing data defines operation timing of the keyboard and the slide disk and the automatic playing timing data is to generate staging sound effects at predetermined timing even without operating the keyboard and the slide disk. On a monitor, an indicator for instructing the player of timing to operate the keyboard and the slide disk is displayed. This indicator is generated based on the operation timing data and indicates operation timing for a music part in a given range from a currently played position.

In the above-mentioned music staging game machine, while the staging sound effects are being generated based on the automatic playing data, the player operates the keyboard and the slide disk at the operation timing displayed on a screen. Therefore, the music staging game machine is required to use the operation timing data and automatic playing timing data specially prepared for the music staging game machine, thereby making it impossible to use general-purpose music data as it is in the music staging game machine. Moreover, the operation timing data and the automatic playing timing data contain pieces of data which overlap with each other, thereby leading to a waste of a data capacity.

Therefore, a feature of example embodiments of the present invention is to provide a computer-readable storage medium having a music playing program stored therein and a music playing apparatus which allow utilization of general-purpose music data not only for simply playing music but also for a variety of other applications.

Example embodiments of the present invention may have the following features. Note that reference numerals indicated between parentheses are merely provided to illustrate one example of a relationship of correspondence with the figures for assisting in the understanding of the present invention, and by no means limit the scope of invention.

A storage medium of example embodiments of the present invention is a computer-readable storage medium having stored therein a music playing program (121) executed by a music playing apparatus (3) for playing music by reproducing music data (126) containing information pertinent to pitches of notes which the music is composed of and reproduction timing information. The music playing program causes a computer (10) in the music playing apparatus to execute: a non-sounding reproduction start step (S11, S71); a note information storing step (S12, S18, S72, S78); a sounding reproduction start step (S17, S95); and a note information utilizing step (S19, S79). The non-sounding reproduction start step starts non-sounding reproduction processing in which the music data is reproduced in a non-sounding manner. The note information storing step sequentially stores, in a note information storage region (123), note information pertinent to notes reproduced in the non-sounding manner each time each of the notes which the music is composed of is reproduced in the non-sounding manner during the non-sounding reproduction processing. The sounding reproduction start step starts sounding reproduction processing, in which the music data is reproduced in a sounding manner after the non-sounding reproduction processing has been started, such that sounding reproduction is performed in parallel with non-sounding reproduction. The note information utilizing step performs, during the sounding reproduction processing, information processing which utilizes the note information stored in the note information storage region.

The music playing program may cause the computer to further execute a reproduction speed control step (S11, S71) of temporarily making a speed at which the music is reproduced in the non-sounding reproduction processing faster than a speed at which the music is reproduced in the sounding reproduction processing. Thus, a waiting time until playing music is started (sounding reproduction) can be reduced.

At the reproduction speed control step, the speed at which the music is reproduced in the non-sounding reproduction processing may be made faster than the speed at which the music is reproduced in the sounding reproduction processing in a time period from when the non-sounding reproduction processing is started to when the sounding reproduction processing is started (S11), and the speed at which the music is reproduced in the non-sounding reproduction processing may be made same as the speed at which the music is reproduced in the sounding reproduction processing after the sounding reproduction processing has been started (S16). Thus, the waiting time until playing music is started (sounding reproduction) can be reduced and a storage capacity of the note information storage region can be saved.

The non-sounding reproduction processing may be a process in which the music data is reproduced with a volume of 0 by utilizing a music data reproduction library (122) having a function of reproducing the music data with any volume. Thus, the note information can be easily obtained by utilizing the existing music data reproduction library.

The note information storage region may be a storage region having a given capacity, which is set in a memory unit (12), and at the note information storing step, when the note information storage region is full, the note information may be stored in the note information storage region in a first-in first-out manner. Thus, the storage capacity of the note information storage region can be saved.

The note information storage region may be a ring buffer. Thus, management of the note information in the note information storage region (for example, a process in which newly generated note information is written over the oldest note information) is made easy.

The music playing program may cause the computer to further execute: a temporary halting step (S14, S74) of temporarily halting, after the non-sounding reproduction processing has been started, the non-sounding reproduction processing before the sounding reproduction processing is started; and a resuming step (S16, S76) of resuming the non-sounding reproduction processing when the sounding reproduction processing is started. Thus, a timing of starting the sounding reproduction can be controlled.

The music data may be MIDI data (126).

The music playing program may cause the computer to further execute a chord data storing step (S36) at which, when in the non-sounding reproduction processing, a plurality of notes are simultaneously outputted in any of tracks defined in the MIDI data, chord data in which the simultaneously outputted plurality of notes are associated with one another as a group is generated and stored in a chord data storage region (124). Thus, it is made easy to utilize the note information at the note information utilizing step.

The music playing program may cause the computer to further execute: a latest chord storing step (S38) of storing, as track data (125), latest chord data in each of the tracks among the chord data stored in the chord data storage region; a latest chord determining step (S34) of determining, each time any of notes is reproduced in the non-sounding reproduction processing, whether or not chord data, which is pertinent to a same track as a track having the reproduced note therein and whose reproduction timing is a same as a timing at which the note is reproduced, is stored as the track data; and a chord association step (S37) of associating, when a determination result obtained at the latest chord determining step is affirmative, the reproduced note with the chord data which is pertinent to the same track as the track having the reproduced note therein and whose reproduction timing is the same as the timing at which the note is reproduced.

The music playing apparatus may include a display unit (2), and at the note information utilizing step, during the sounding reproduction processing, an image of a score may be generated based on the note information stored in the note information storage region and may be outputted to the display unit.

The music playing apparatus may include an input unit (7), the music playing program may cause the computer to further execute an input detection step (S90) of detecting an input from the input unit during the sounding reproduction processing, the note information utilizing step may include: a shift width calculation step (S91) of calculating a shift width between a timing of the input from the input unit, which is detected at the input detection step, and an ideal input timing based on the music data; and a note information altering step (S92) of altering, based on the shift width calculated at the shift width calculation step, a part or all of the note information stored in the note information storage region, and the sounding reproduction start step may include a note generation step (S95) of generating notes based on the altered note information. Thus, it is made easy to play music while altering, for example, a reproduction timing, a sound pitch, and a sound length of a note in a real-time manner.

The note information may contain at least the reproduction timing information, and at the note information altering step, the reproduction timing information contained in the note information stored in the note information storage region may be altered based on the calculated shift width.

At the note information altering step, an altering amount of the note information may be increased in accordance with an increase in the calculated shift width.

The music playing apparatus may include an input unit (7) having an operation strength detection function (701), the note information may contain at least note length information of each of the notes, the music playing program may cause the computer to further execute an operation strength detection step of detecting an operation strength exerted on the input unit during the sounding reproduction processing, and at the note information utilizing step, the note length information contained in the note information stored in the note information storage region may be altered based on the operation strength exerted on the input unit, which has been detected at the operation strength detection step.

A music playing apparatus (3) is an apparatus for playing music by reproducing music data (126) containing information pertinent to pitches of notes which the music is composed of and reproduction timing information, comprising: a non-sounding reproduction start unit (10, S11, S71); a note information storing unit (10, S12, S18, S72, S78); a sounding reproduction start unit (10, S17, S95); and a note information utilizing unit (10, S19, S79). The non-sounding reproduction start unit (10, S11) is a unit for starting non-sounding reproduction processing in which the music data is reproduced in a non-sounding manner. The note information storing unit is a unit for sequentially storing, in a note information storage region, note information pertinent to notes reproduced in the non-sounding manner each time each of the notes which the music is composed of is reproduced in the non-sounding manner during the non-sounding reproduction processing. The sounding reproduction start unit is a unit for starting sounding reproduction processing, in which the music data is reproduced in a sounding manner after the non-sounding reproduction processing has been started, such that sounding reproduction is performed in parallel with non-sounding reproduction. The note information utilizing unit is a unit for performing, during the sounding reproduction processing, information processing which utilizes the note information stored in the note information storage region.

Example embodiments of the present invention allow utilization of general-purpose music data not only for simply playing music but also for a variety of other applications.

These and other features, aspects and advantages of example embodiments of the present invention will become more apparent from the following detailed description of the present invention when taken in conjunction with the accompanying drawings.

BRIEF DESCRIPTION OF THE DRAWINGS

FIG. 1 is an external view illustrating a game system 1 according to an embodiment of the present invention;

FIG. 2 is a block diagram showing a configuration of a game apparatus 3;

FIG. 8 shows a memory map of an external main memory 12;

FIG. 9 shows a data structure of MIDI data 126;

FIG. 17 shows contents of a note pool 123;

FIG. 18 shows contents of a chord pool 124;

FIG. 19 shows contents of track data 125;

DETAILED DESCRIPTION

Figure 3:
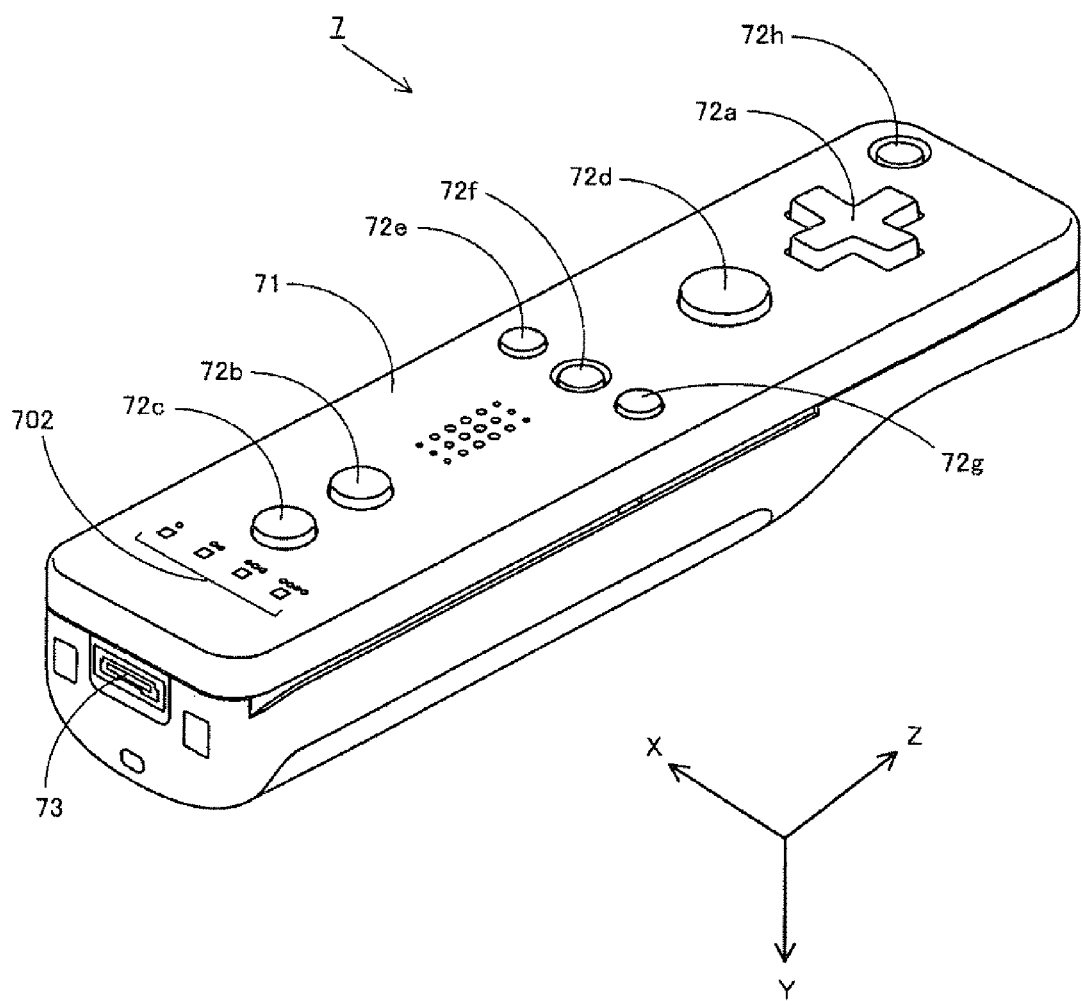
FIG. 3 is a perspective view of a controller 7, seen from a top rear side thereof.

Hereinafter, with reference to figures, a variety of embodiments of the present invention will be described.

First, one example of a hardware configuration for carrying out the present invention will be described. Here, an example in which the present invention is applied to a game system.

(Whole Configuration of Game System)

With reference to FIG. 1, a game system 1 including a game apparatus according to an embodiment of the present invention will be described. FIG. 1 is an external view illustrating the game system 1. Hereinafter, a game apparatus which is a stationary game apparatus as one example and a game program according to the present embodiment will be described. As shown in FIG. 1, the game system 1 includes a TV receiver 2 (hereinafter, simply referred to as a "television 2"), a game apparatus 3, an optical disc 4, marker section 6, and a controller 7. In this system, game processing is executed in the game apparatus 3 based on game operations performed by using the controller 7.

The optical disc 4 as an example of an exchangeable information storage medium is detachably inserted into the game apparatus 3. The optical disc 4 has stored therein a game program to be executed in the game apparatus 3. On a front surface of the game apparatus 3, a slot into which the optical disc 4 is inserted is provided. The game apparatus 3 executes the game processing by reading out and executing the game program stored in the optical disc which has been inserted into the slot.

The television 2 which is one example of a display apparatus is connected to the game apparatus 3 via a connecting cord. The television 2 displays a game image obtained by performing the game processing executed in the game apparatus 3. In addition, on a periphery of a screen of the television 2 (upper side of the screen in FIG. 1), the marker section 6 is installed. The marker section 6 includes markers 6R and 6L on each end thereof. The marker 6R (as well as 6L) specifically is one or more infrared LEDs and outputs infrared light forward in front of the television 2. The marker section 6 is connected to the game apparatus 3 and the game apparatus 3 is capable of controlling lighting of the infrared LEDs included in the marker section 6.

The controller 7 is an input unit which provides the game apparatus 3 with operation data indicating information pertinent to operations performed on the controller 7. The controller 7 and the game apparatus 3 are connected through wireless communications. In the present embodiment, the technology of, for example, Bluetooth (registered trademark) is employed for the wireless communications between the controller 7 and the game apparatus 3. Note that in the other embodiments, the controller 7 and the game apparatus 3 may be connected in a wired manner.

(Internal Configuration of Game Apparatus 3)

Next, an internal configuration of the game apparatus 3 will be described with reference to FIG. 2. FIG. 2 is a block diagram illustrating the configuration of the game apparatus 3. The game apparatus 3 has a CPU 10, a system LSI 11, an external main memory 12, a ROM/RTC (Read Only Memory/ Real Time Clock) 13, a disc drive 14, an AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, ROM/ RTC 13, disc drive 14 and the AV-IC 15 are connected to the system LSI 11. The system LSI 11 performs processing such as: controlling data transfer among components connected to the system LSI 11; generating an image to be displayed; and obtaining data from external devices. An internal configuration of the system LSI 11 will be described later. The external main memory 12, which is a volatile memory, stores such a program as the game program loaded from the optical disc 4, or the game program loaded from the flash memory 17, and various data. The external main memory 12 is used as a work region or buffer region of the CPU 10. The ROM/RTC 13 has a ROM, in which a boot program for the game apparatus 3 is incorporated (so-called boot ROM), and a clock circuit (RTC: Real Time Clock) which counts the time. The disc drive 14 reads program data, texture data and the like from the optical disc 4, and writes the read data into a later-described internal main memory 11e or into the external main memory 12.

On the system LSI 11, an input/output processor (I/O processor) 11a, a GPU (Graphics Processor Unit) 11b, a DSP (Digital Signal Processor) 11c, a VRAM 11d and the internal main memory 11e are provided. Although not shown, these components 11a to 11e are connected to each other via an internal bus.

The GPU 11b partly forms rendering means, and generates an image in accordance with a graphics command from the CPU 10. The VRAM 11d stores necessary data for the GPU 11b to execute the graphics command (data such as polygon data and texture data). At the time of generating the image, the GPU 11b uses the data stored in the VRAM 11d, thereby generating image data.

The DSP 11c acts as an audio processor, and generates audio data by using sound data and sound waveform (tone) data stored in the internal main memory 11e and external main memory 12.

The image data and audio data generated in the above manner are read by the AV-IC 15. The AV-IC 15 outputs the read image data to the television 2 via the AV connector 16, and outputs the read audio data to the speakers 2*a* embedded in the television 2. As a result, the image is displayed on the television 2 and the sound is outputted from the speakers 2*a*.

The input/output processor 11*a* performs data transmission/reception with components connected thereto, and downloads data from external devices, for example. The input/output processor 11*a* is connected to the flash memory 17, a wireless communication module 18, the wireless controller module 19, an expansion connector 20 and an external memory card connector 21. An antenna 22 is connected to the wireless communication module 18, and the antenna 23 is connected to the wireless controller module 19.

The input/output processor 11*a* is connected to a network via the wireless communication module 18 and antenna 22, thereby communicating with other game apparatuses and various servers connected to the network. The input/output processor 11*a* regularly accesses the flash memory 17 to detect presence or absence of data which is required to be transmitted to the network. If such data is present, the data is transmitted to the network via the wireless communication module 18 and antenna 22. Also, the input/output processor 11*a* receives, via the network, antenna 22 and wireless communication module 18, data transmitted from other game apparatuses or data downloaded from a download server, and stores the received data in the flash memory 17. By executing the game program, the CPU 10 reads the data stored in the flash memory 17 to use the data for the game program. In addition to the data transmitted and received between the game apparatus 3 and other game apparatuses or various servers, the flash memory 17 may store saved data of the game which is played using the game apparatus 3 (such as result data or progress data of the game).

Further, the input/output processor 11*a* receives, via the antenna 23 and wireless controller module 19, operation data or the like transmitted from the controller 7, and stores (temporarily) the operation data or the like in a buffer region of the internal main memory 11*e* or external main memory 12.

In addition, the expansion connector 20 and the external memory card connector 21 are connected to the input/output processor 11*a*. The expansion connector 20 is a connector for such interface as USB or SCSI. The expansion connector 20, instead of the wireless communication module 18, is able to perform communications with a network by being connected to such a medium as external storage medium, a peripheral device, e.g., another controller, or a connector for wired communication. The external memory card connector 21 is a connector to be connected to an external storage medium such as a memory card. For example, the input/output processor 11*a* is able to access the external storage medium via the expansion connector 20 or external memory card connector 21 to store or read data from the external storage medium.

On the game apparatus 3, a power button 24, a reset button 25, and an eject button 26 are provided. The power button 24 and reset button 25 are connected to the system LSI 11. When the power button 24 is turned on, each component of the game apparatus 3 is supplied with power via an AC adaptor which is not shown. When the reset button 25 is pressed, the system LSI 11 reexecutes the boot program of the game apparatus 3. The eject button 26 is connected to the disc drive 14. When the eject button 26 is pressed, the optical disc 4 is ejected from the disc drive 14.

Figure 4:
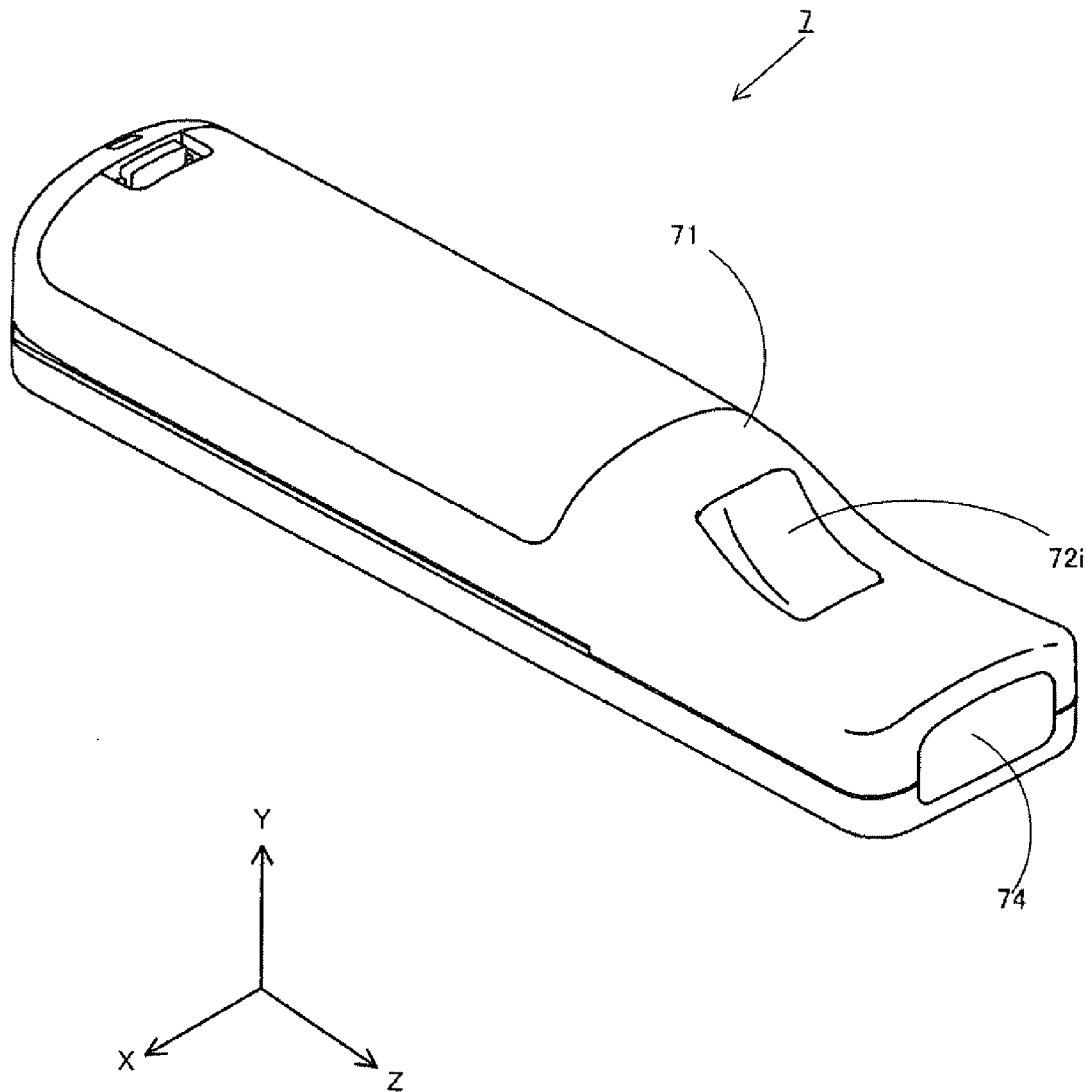
FIG. 4 is a perspective view of the controller 7, seen from a bottom front side thereof.

With reference to FIGS. 3 and 4, the controller 7 will be described. FIG. 3 is a perspective view of the controller 7 seen from a top rear side thereof. FIG. 4 is a perspective view of the controller 7 seen from a bottom front side thereof.

As shown in FIGS. 3 and 4, the controller 7 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72*a* is provided. The cross key 72*a* is a cross-shaped four-direction push switch. The cross key 72*a* includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72*a*. Through an operation of the cross key 72*a*, the player can, for example, indicate a direction in which a player character or the like appearing in a virtual game world is to move, or give an instruction to select one of a plurality of options.

The cross key 72*a* is an operation section for outputting an operation signal in accordance with the above-described direction input operation performed by the player. Such an operation section may be provided in another form. For example, an operation section, which has four push switches arranged in crisscross directions and which is capable of outputting an operation signal in accordance with a push switch pressed by the player, may be provided. Alternatively, an operation section, which has a composite switch having, in addition to the above four push switches, a center switch at an intersection point of the above crisscross directions, may be provided. Still alternatively, the cross key 72*a* may be replaced with an operation section which includes an inclinable stick (so-called joy stick) projecting from a top surface of the housing 71 and which outputs an operation signal in accordance with an inclining direction of the stick. Still alternatively, the cross key 72*a* may be replaced with an operation section which includes a horizontally-slidable disc-shaped member and which outputs an operation signal in accordance with a sliding direction of the disc-shaped member. Still alternatively, the cross key 72*a* may be replaced with a touch pad.

Behind the cross key 72*a* on the top surface of the housing 71, a plurality of operation buttons 72*b* to 72*g* are provided. The operation buttons 72*b* to 72*g* are each an operation section for, when the player presses a head thereof, outputting a corresponding operation signal. For example, functions as a 1st button, 2nd button and A button are assigned to the operation buttons 72*b* to 72*d*. Also, functions as a minus button, home button and plus button are assigned to the operation buttons 72*e* to 72*g*, for example. Various operation functions are assigned to the operation buttons 72*a* to 72*g* in accordance with the game program executed by the game apparatus 3. In an exemplary arrangement shown in FIG. 3, the operation buttons 72*b* to 72*d* are arranged in a line at the center in a front-rear direction on the top surface of the housing 71. The operation buttons 72*e* to 72*g* are arranged on the top surface of the housing 71 in a line in a left-right direction between the operation buttons 72*b* and 72*d*. The operation button 72*f* has a top surface thereof buried in the top surface of the housing 71, so as not to be inadvertently pressed by the player.

In front of the cross key 72*a* on the top surface of the housing 71, an operation button 72*h* is provided. The operation button 72*h* is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, e.g., informing the player of the controller type which is currently set for the controller 7. Specifically, when transmit data is sent from the controller 7 to the wireless communication module 18, one of the plurality of LEDs 702, which corresponds to the above-mentioned controller type of the controller 7, is lit up.

On the top surface of the housing 71, sound holes for outputting sounds from a later-described speaker (speaker 706 shown in FIG. 5) to the external space are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller 7 so as to point a front surface thereof to the markers 8L and 8R. On a slope surface of the recessed portion on the bottom surface, an operation button 72i is provided. The operation button 72i is an operation section acting as, for example, a B button.

On a front surface of the housing 71, an image pickup element 743 forming a part of the imaging information calculation section 74 is provided. The imaging information calculation section 74 is a system for: analyzing image data of an image taken by the controller 7; identifying an area having a high brightness in the image; and detecting a position of a center of gravity, a size and the like of the area. The imaging information calculation section 74 has, for example, a maximum sampling period of approximately 200 frames/sec, and therefore can trace and analyze even relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

Here, in order to make the following description specific, coordinate systems which are set for the controller 7 will be defined. As shown in FIGS. 3 and 4, the X, Y, Z axes which are mutually-perpendicular will be defined with respect to the controller 7. Specifically, a longitudinal direction of the housing 71, in which the controller 7 moves back and forth, is defined as the Z axis. A direction which a front surface of the controller 7 (a surface on which the imaging information calculation section 74 is provided) faces is defined as a Z axis forward direction. A direction in which the controller 7 moves up and down is defined as the Y axis. A direction which the bottom surface of the housing 71 (a surface on which the operation button 72i is provided) faces is defined as a Y axis forward direction. A right-and-left direction of the controller 7 is defined as the X axis. A direction which a side surface of the housing 71 (a side surface which is not shown in FIG. 3 but is shown in FIG. 4) faces is defined as an X axis forward direction.

Figure 5:
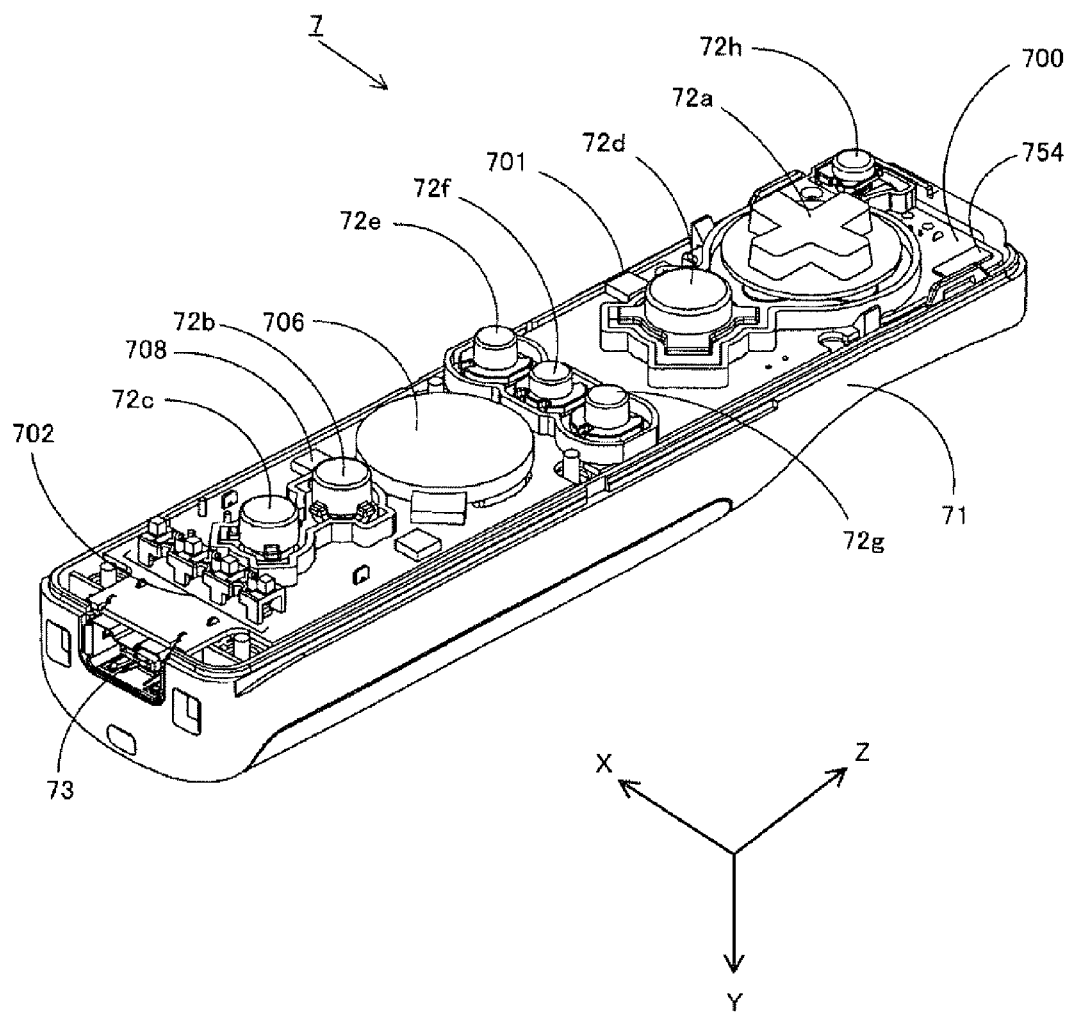
FIG. 5 is a perspective view illustrating a state where an upper casing of the controller 7 is removed.
Figure 6:
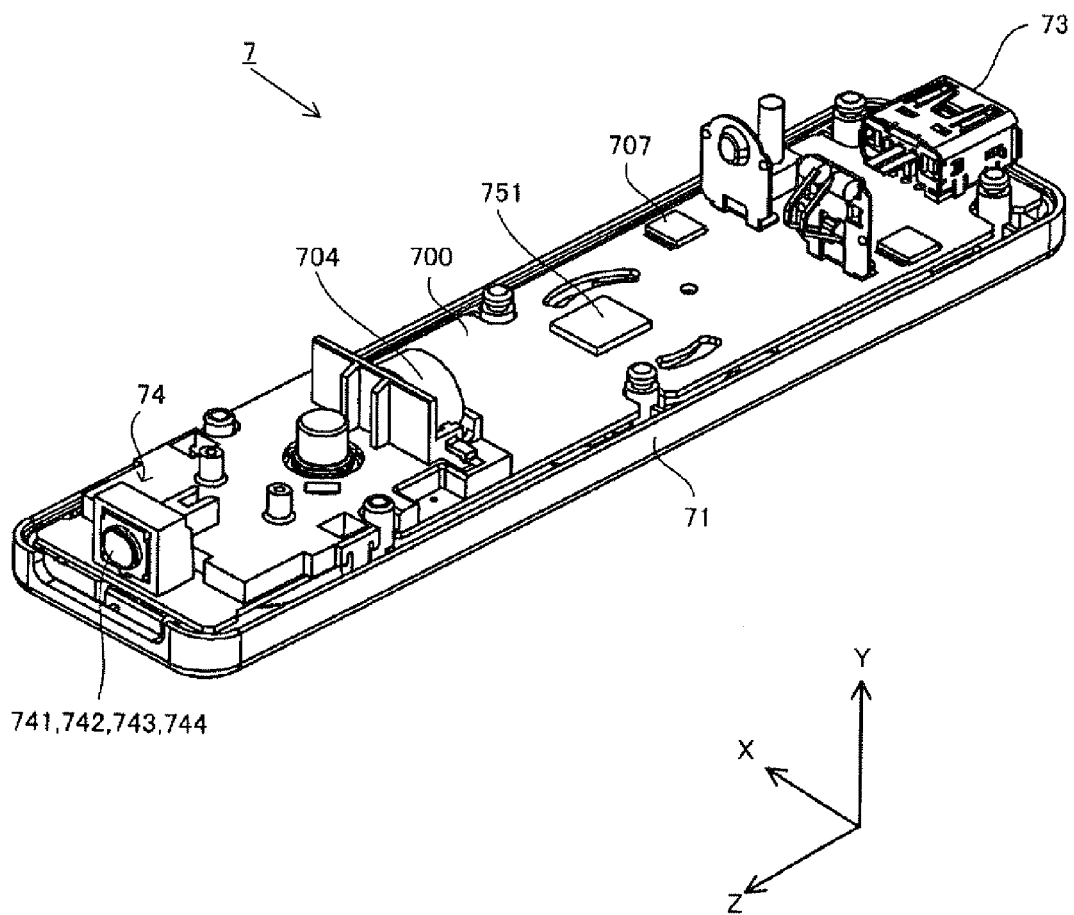
FIG. 6 is a perspective view illustrating a state where a lower casing of the controller 7 is removed.

Next, an internal structure of the controller 7 will be described with reference to FIGS. 5 and 6. FIG. 5 is a perspective view, seen from a rear surface side of the controller 7, illustrating a state where an upper casing (a part of the housing 71) of the controller 7 is removed. FIG. 6 is a perspective view, seen from a front surface side of the controller 7, illustrating a state where a lower casing (a part of the housing 71) of the controller 7 is removed. Here, FIG. 6 is a perspective view showing a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754 and the like are provided. These elements are connected to, e.g., a microcomputer 751 (see FIGS. 6 and 7) by wirings (not shown) formed on the substrate 700 and the like. The wireless module 753 (see FIG. 7) and antenna 754 allow the controller 7 to act as a wireless controller. Inside the housing 71, a quartz oscillator 703, which is not shown, is provided, and the quarts oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72d (i.e., provided not on a central portion but on a peripheral portion of the substrate 700). For this reason, in response to the controller 7 having rotated around an axis of a longitudinal direction of the controller 7, the acceleration sensor 701 is able to detect, in addition to a change in direction of gravitational acceleration, an acceleration containing centrifugal components, and the game apparatus 3 or the like is able to determine, based on detected acceleration data, motion of the controller 7 by a predetermined calculation with a favorable sensitivity.

As shown in FIG. 6, at a front edge of a bottom main surface of the substrate 700, the imaging information calculation section 74 is provided. The imaging information calculation section 74 comprises an infrared filter 741, a lens 742, the image pickup element 743 and an image processing circuit 744 which are located in said order from the front surface of the controller 7. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and amplifier 708 by wirings formed on the substrate 700 and the like, and outputs audio signals via the amplifier 708 to the speaker 706 in response to sound data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 by wirings formed on the substrate 700 and the like, and is activated or deactivated in response to vibration data transmitted from the game apparatus 3. The controller 7 is vibrated by an actuation of the vibrator 704, and the vibration is conveyed to the player's hand holding the controller 7. Thus, a so-called vibration-feedback game is realized. Since the vibrator 704 is provided at a relatively forward position in the housing 71, the housing 71 held by the player significantly vibrates, and allows the player to clearly feel the vibration.

Figure 7:
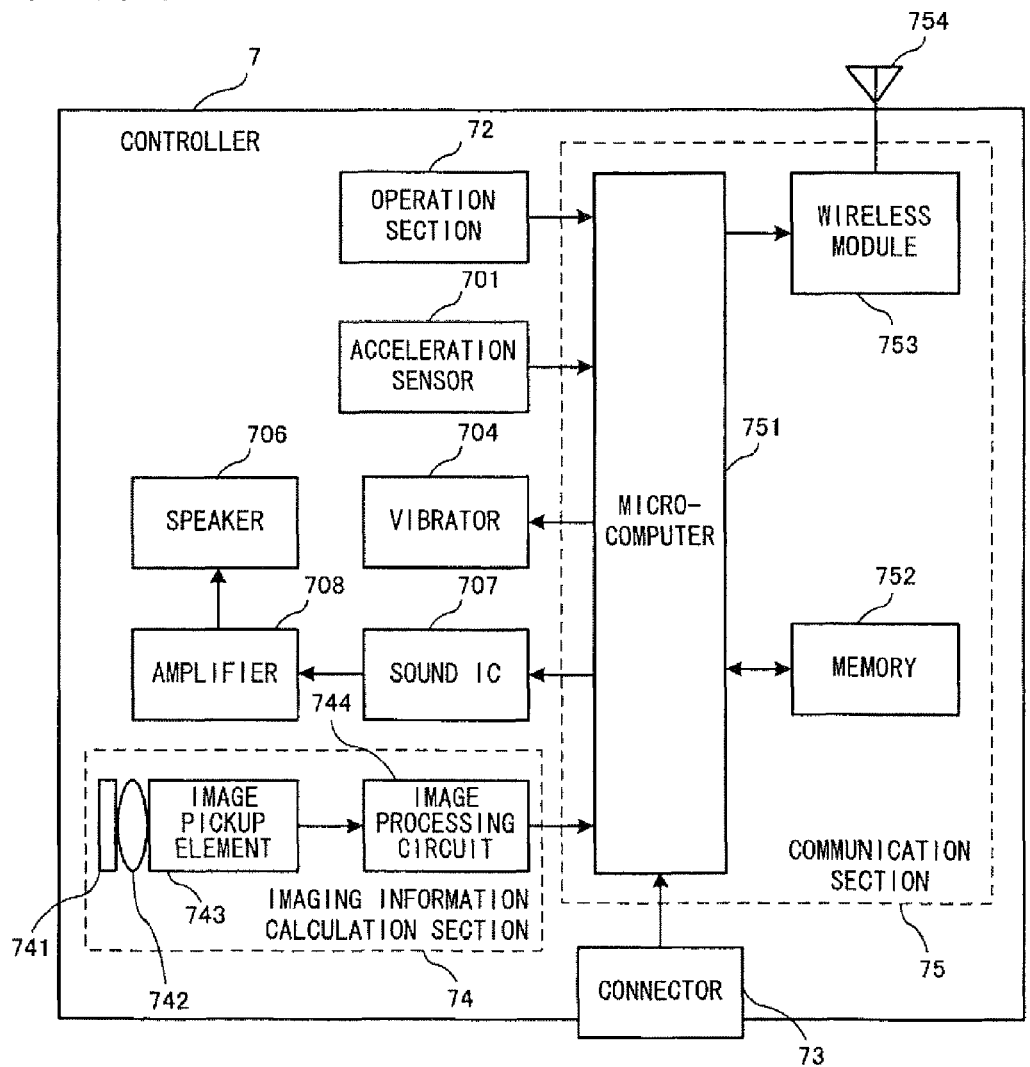
FIG. 7 is a block diagram showing a configuration of the controller 7.

Next, an internal configuration of the controller 7 will be described with reference to FIG. 7. FIG. 7 is a block diagram showing the configuration of the controller 7.

As shown in FIG. 7, in addition to the above-described operation sections 72, imaging information calculation section 74, acceleration sensor 701, vibrator 704, speaker 706, sound IC 707 and the amplifier 708, the controller 7 includes the communication section 75.

The imaging information calculation section 74 includes the infrared filter 741, lens 742, image pickup element 743 and the image processing circuit 744. The infrared filter 741 allows, among lights incident thereon through the front surface of the controller 7, only infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image, which area has a high brightness, and outputs, to the communication section 75, process result data indicating, e.g., position coordinates, square measure and the like detected from the area. The imaging information calculation section 74 is fixed to the housing 71 of the controller 7. An imaging direction of the imaging information calculation section 74 can be changed by changing a facing direction of the housing 71.

It is preferable that the controller 7 includes the acceleration sensor 701 for three axes (X, Y, and Z axes). The acceleration sensor 701 for three axes senses linear accelerations in three directions, i.e., an up-and-down direction (Y axis shown in FIG. 3), a right-and-left direction (X axis shown in FIG. 3), and a back-and-forth direction (Z axis shown in FIG. 3).

The communication section 75 includes the microcomputer 751, a memory 752, the wireless module 753 and the antenna 754. The microcomputer 751 controls the wireless module 753 for wirelessly transmitting transmission data while using the memory 752 as a storage area during processing. The microcomputer 751 also controls operations of the sound IC 707 and vibrator 704 in accordance with data which the wireless module 753 has received from the game apparatus 3 via the antenna 754. The sound IC 707 processes sound data or the like transmitted from the game apparatus 3 via the communication section 75. Further, the microcomputer 751 activates the vibrator 704 in accordance with vibration data or the like (e.g., a signal for causing the vibrator 704 to be ON or OFF) which is transmitted from the game apparatus 3 via the communication section 75.

Data from the controller 7 such as operation signals (key data) from the operation sections 72, acceleration signals (acceleration data with respect to X-, Y-, and Z-axis directions) from the acceleration sensor 701 with respect to the three axial directions, and the process result data from the imaging information calculation section 74 are outputted to the microcomputer 751. The microcomputer 751 temporarily stores inputted data (the key data, the acceleration data with respect to X-, Y-, and Z-axis directions and process result data) in the memory 752 as transmission data to be transmitted to the wireless communication module 18. Here, radio transmission from the communication section 75 to the wireless communication module 18 is performed at predetermined time intervals. Since the game processing is generally performed in at a cycle of 1/60 sec, the radio transmission needs to be performed at a cycle of a shorter time period. Specifically, the game processing is performed at a cycle of 16.7 ms (1/60 sec), and a transmission interval of the communication section 75 structured using the Bluetooth (registered trademark) technology is 5 ms. At a timing of performing a transmission to the wireless communication module 18, the microcomputer 751 outputs, to the wireless module 753, the transmission data stored in the memory 752 as a series of pieces of operation information. The wireless module 753 uses, for example, the Bluetooth (registered trademark) technology to send, with a carrier wave having a predetermined frequency, operation information as a radio signal from the antenna 754. Thus, the key data from the operation sections 72, the acceleration data with respect to X-, Y-, and Z-axis directions from the acceleration sensor 701, and the process result data from the imaging information calculation section 74 are transmitted from the controller 7. The wireless communication module 18 of the game apparatus 3 receives the radio signal, and the game apparatus 3 demodulates or decodes the radio signal to obtain the series of pieces of operation information (the key data, the acceleration data with respect to X-, Y-, and Z-axis directions and process result data). In accordance with the series of pieces of obtained operation information and the game program, the CPU 10 of the game apparatus 3 performs game processing. In the case where the communication section 75 is structured using the Bluetooth (registered trademark) technology, the communication section 75 can have a function of receiving transmission data wirelessly transmitted from other devices.

Note that the above-described hardware configuration is merely one example and the present invention is applicable to any computer system.

Next, an outline of music playing processing executed in the present embodiment will be described.

In the present embodiment, a music playing program loaded from the optical disc 4 or the like to the external main memory 12 (or the internal main memory 11e) is executed by the CPU 10, whereby the music playing processing is performed. One example of a memory map of the external main memory 12 is shown in FIG. 8. Details of a program and pieces of data shown in the memory map in FIG. 8 will be made clear by the below description.

In the present embodiment, music playing is performed based on music data (herein, simply referred to as "MIDI data") in conformity with MIDI (Musical Instruments Digital Interface) specification. Note that there is SMF (Standard MIDI File) as an example of standard MIDI data.

(MIDI Data)

Hereinafter, MIDI data 126 will be briefly described. In the MIDI data 126, a plurality of notes contained in music is managed by one or more tracks (which correspond to scores). In other words, the notes contained in the music belong to any of the tracks. It is supposed herein that the number of the tracks is up to 16.

The MIDI data 126 is represented as an aggregate of a plurality of MIDI events. As such a MIDI event, there are a variety of MIDI events such as a "note event" for playing notes, a "control change event" for changing a volume and a timbre of a note for each of the tracks, a "pitchbend event", and a "program change event".

Figure 10:
FIG. 10 shows a score corresponding to the MIDI data 126.
Figure 11:
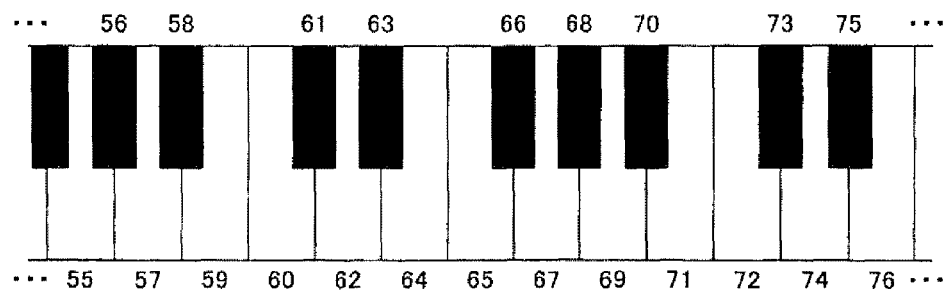
FIG. 11 shows a correspondence relationship between "pitches" and plano keys.

FIG. 9 shows one example of the MIDI data 126. Note that although only the note event among the MIDI events is shown in FIG. 9 in order to facilitate understanding, in reality, MIDI events other than the note event are also contained in the MIDI data 126 as described above. Each of the rows in FIG. 9 corresponds to one note event. The MIDI data 126 in FIG. 9 corresponds to a score shown in FIG. 10. "Belonging track" is information indicating in which track a note played by a note event is contained. "Reproduction timing" is information indicating a timing at which a note is played and is shown by a unit of ticks. In the present embodiment, it is supposed that one tick is a length corresponding to one 48th of a quarter note. "Note length (duration)" is information indicating a length of a note and is shown as ticks. "Sound pitch (note number)" is information literally indicating a sound pitch. FIG. 11 shows a correspondence relationship between values of sound pitches in the MIDI data 126 and piano keys. "Velocity" is information indicating intensity of playing a note. Note that information other than the parameters shown in FIG. 9 may be included in the note events.

The MIDI data 126 can be reproduced by using application software called "MIDI Player". In general, the "MIDI Player" reproduces the MIDI events contained in the MIDI data 126 by processing the MIDI events in a sequential manner starting from the first one. Utilization of the existing program library (herein, referred to as a "music data reproduction library") having a function of the MIDI Player allows music to be easily reproduced based on the MIDI data 126 without newly generating a computer program for reproducing the MIDI data 126. Also in the present embodiment, music is reproduced by utilizing such a music data reproduction library 122.

(Outline of Music Playing Processing in the Present Embodiment)

Meanwhile, it has been desired that when music is being reproduced based on the MIDI data 126 by utilizing the music data reproduction library 122, a displayed image, an outputted note, the content of a game, or the like is changed based on information pertinent to a note (i.e., a note to be played in the future) to be played later than a currently played note. For example, it has been desired that in the midst of reproducing music based on the MIDI data 126, a score of a part from a currently played position to a position two bars ahead of the currently played position is displayed on a screen. As described above, the note event contains the information pertinent to the sound pitch, the sound length, the reproduction timing and the like, whereby it is made possible to generate an image of a score based on the MIDI data 126 without separately preparing the image of the score. However, in order to generate the image of the score of a part from a currently played position to a position two bars ahead of the currently played position, it is required to generate the image of the score based on the extracted note event, by extracting as needed from the MIDI data a note event corresponding to the part from a currently played position to a position two bars ahead of the currently played position. In the present embodiment, such complicated processing is realized by a very simple computer program (music playing program 121).

In the present embodiment, prior to reproducing the MIDI data 126 in a sounding manner, the same MIDI data 126 is reproduced in a non-sounding manner by utilizing the music data reproduction library 122, note data (which will be later described in detail) is generated based on a note event generated in this reproduction in the non-sounding manner, and the generated note data is temporarily retained in a storage region. Here, the former reproduction processing (reproduction in the sounding manner) is referred to as "actual reproduction" and the latter reproduction processing (reproduction in the non-sounding manner) is referred to as "prior read reproduction". The storage region for temporarily retaining the note data is referred to as a "note pool". A note pool 123 is, for example, a storage region having a given capacity, which is set in the external main memory 12, and stores the note data in a first-in first-out manner.

Figure 12:
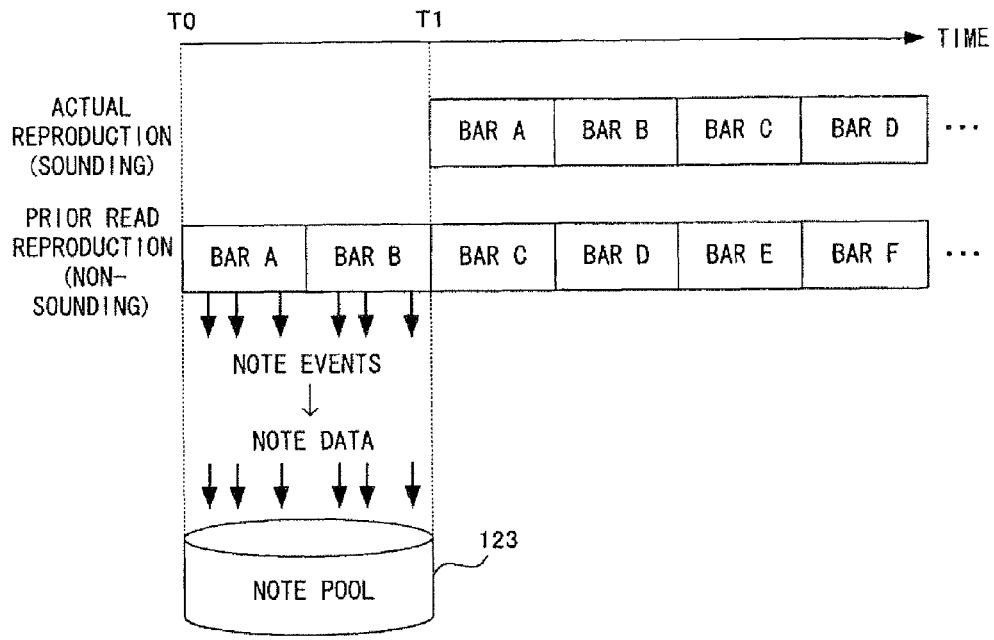
FIG. 12 is a diagram showing an outline of processing in the present embodiment.
Figure 13:
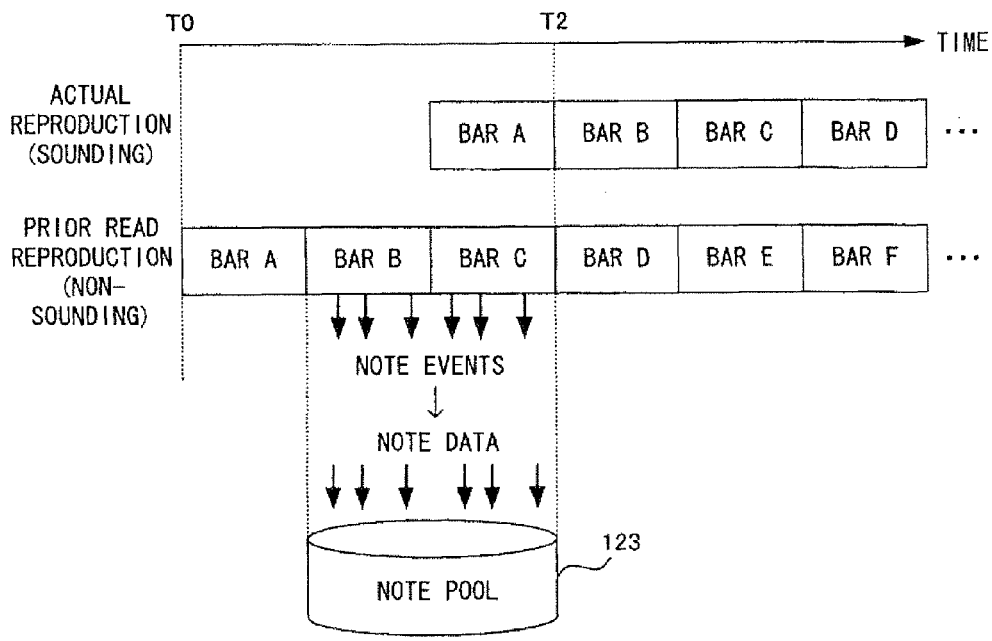
FIG. 13 is a diagram showing the outline of the processing in the present embodiment.
Figure 14:
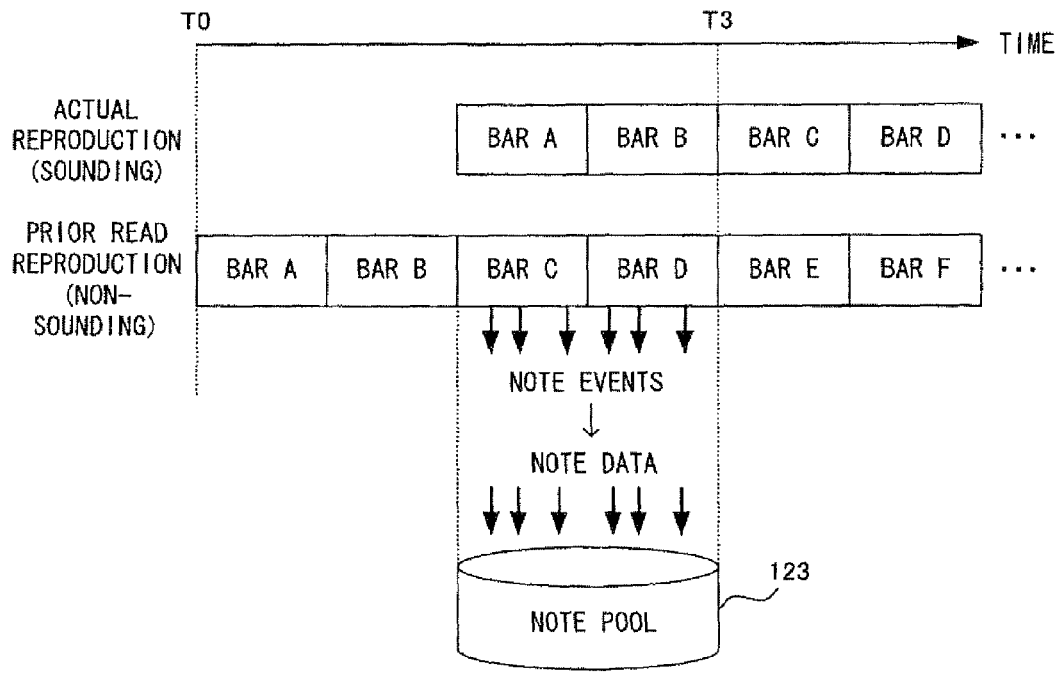
FIG. 14 is a diagram showing the outline of the processing in the present embodiment.

With reference to FIG. 12 through FIG. 14, a correspondence relationship between a current reproduction position in the actual reproduction and the note data stored in the note pool 123 at that time point will be described. Here, it is supposed that the prior read reproduction is started at a time T0 and the actual reproduction is started at a time T1.

First, at the time T0, the prior read reproduction is started. This is performed by instructing the music data reproduction library 122 to start reproduction of the MIDI data 126 and to set a volume to be 0. Upon starting the prior read reproduction, an MIDI event containing a note event is sequentially generated. Thus, each time a note event is generated, note data is generated based on this note event and sequentially stored in the note pool 123.

At the time T1, the actual reproduction is started. Note data stored in the note pool 123 at the time T1 is shown in FIG. 12. At the time T1, note data pertinent to bars A to B have been retained in the note pool 123. Thus, based on this note data, an image of a score of the bars A to B which have not yet been actually reproduced can be generated and displayed on the screen of the television 2.

After the time T1, the actual reproduction and the prior read reproduction are concurrently performed at the same speed. Accordingly, the prior read reproduction precedes invariably two bars ahead of the actual reproduction.

At a time T2, actual reproduction of the bar B is started. Note data stored in the note pool 123 at the time T2 is shown in FIG. 13. At the time T2, note data pertinent to bars B to C have been retained in the note pool 123. Thus, based on this note data, an image of a score of the bars B to C which have not yet been actually reproduced can be generated and displayed on the screen of the television 2. Note that it is acceptable that at the time T2, the note data pertinent to the bar A has already been deleted from the note pool 123.

At a time T3, actual reproduction of the bar C is started. Note data stored in the note pool 123 at the time T3 is shown in FIG. 14. At the time T3, note data pertinent to bars C to D have been retained in the note pool 123. Thus, based on this note data, an image of a score of the bars C to D which have not yet been actually reproduced can be generated and displayed on the screen of the television 2. Note that it is acceptable that at the time T3, the note data pertinent to the bar B has already been deleted from the note pool 123.

As described above, according to the present embodiment, while the MIDI data 126 is being actually reproduced, the note data pertinent to the note event at least two bars ahead of the current reproduction position (reproduction position in the actual reproduction) has invariably been retained in the note pool 123. Thus, based on the information pertinent to a note (i.e., a note to be played in the future) to be played later than a currently played note, a displayed image, an outputted note, the content of a game, or the like can be changed. In particular, the MIDI data 126 is reproduced in the non-sounding manner by utilizing the music data reproduction library 122, and the note data is generated based on the note event generated in this non-sounding reproduction. Thus, it is not required to newly prepare a computer program for extracting as needed from the MIDI data 126 the note event pertinent to a part from a currently played position to a position two bars ahead of the currently played position, thereby increasing an efficiency of preparing a computer program. In addition, it is only required for the note pool 123 to have a capacity of storing the note data pertinent to the note event of a part from a currently played position (reproduction position in the actual reproduction) to a position two bars ahead of the currently played position. Thus, a needed capacity of the storage region can be reduced as compared with a case where all the note events contained in the MIDI data 126 are previously extracted and stored.

Note that although in the above-described example, the prior read reproduction precedes the two bars ahead of the actual reproduction, how many bars the prior read reproduction precedes ahead of the actual reproduction should be determined appropriately in accordance with a purpose.

Figure 15:
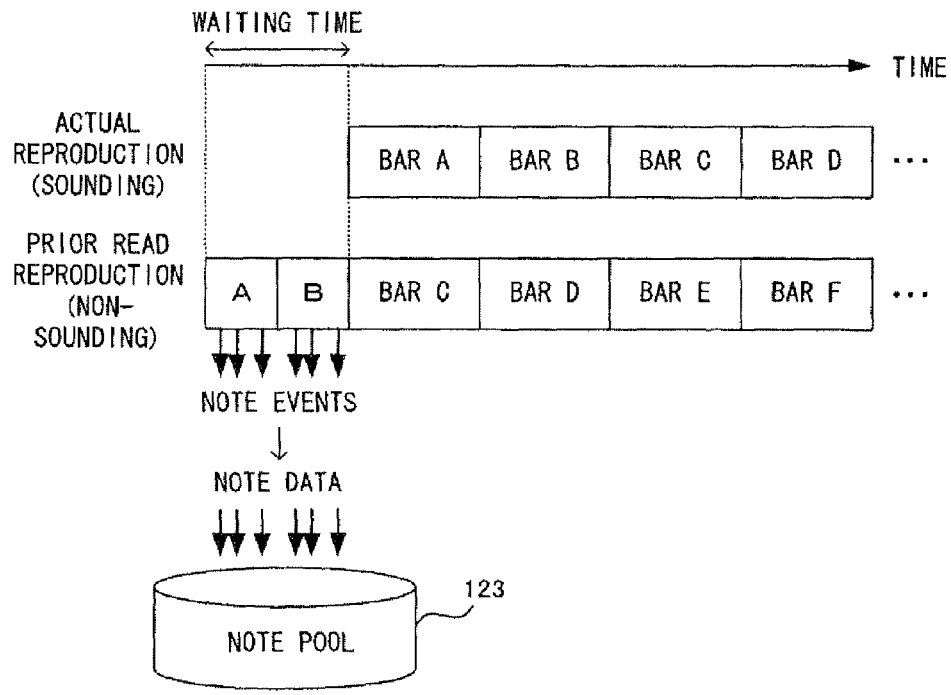
FIG. 15 is a diagram showing the outline of the processing in the present embodiment.

As shown in FIG. 12, in a period of time from the time T0 (start time of the prior read reproduction) to the time T1 (start time of the actual reproduction), a note based on the MIDI data 126 cannot be played (in the sounding manner). In other words, the technique of the present embodiment does not allow the actual reproduction of the MIDI data 126 to be started during a given period of time (the period from the time T0 to the time T1) from when an instruction of starting to reproduce the MIDI data 126 is issued. Therefore, in order to minimize such a waiting time, it is preferable that as shown in FIG. 15, the prior read reproduction is performed at a higher speed than usual (for example, 100 times as fast as usual) for a period until when the actual reproduction is started. This is performed by instructing, at the time of starting the prior read reproduction, the music data reproduction library 122 to perform high-speed reproduction. Even in this case, after having started the actual reproduction, it is required to concurrently perform the actual reproduction and the prior read reproduction at the same speed in order to avoid an overflow of the note pool 123. Therefore, at the time of starting the actual reproduction, it is required to reset the speed of the prior read reproduction to the usual speed (more accurately, the same speed as that of the actual reproduction).

Figure 16:
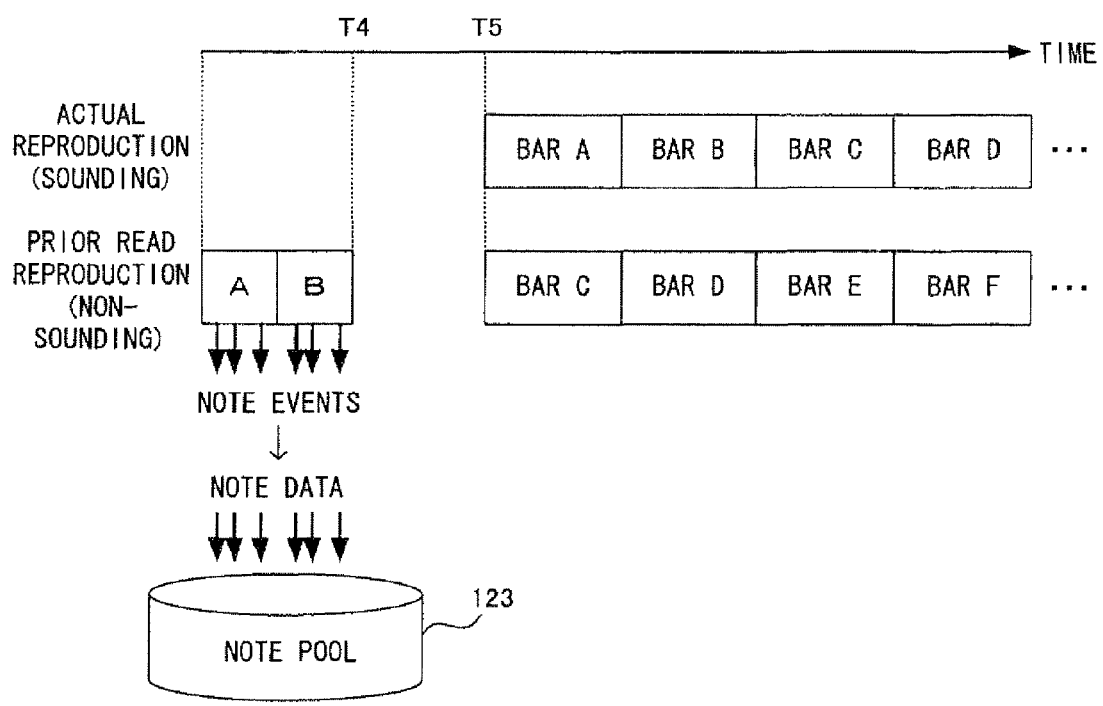
FIG. 16 is a diagram showing the outline of the processing in the present embodiment.

In a case where it is desired to start the actual reproduction at a specific timing (for example, when a player presses a specific switch provided on the controller 7), it is only required to start the prior read reproduction sufficiently ahead of the specific timing (T5) as shown in FIG. 16, to temporarily halt the prior read reproduction at the time point (T4) when the prior read reproduction of the bars A and B has been completed, and thereafter, to release the temporary halt at the time point of the specific timing. This is performed by instructing, at the time point when the prior read reproduction of the bars A and B has been completed, the music data reproduction library 122 to temporarily halt the prior read reproduction and thereafter, to release the temporary halt (in other words, to resume the prior read reproduction) at the time point of starting the actual reproduction. Thus, not only the overflow of the note pool 123 can be prevented but also the actual reproduction can be started at a specific timing.

(Note Data)

Next, with reference to FIG. 17, note data will be described in detail. The note data is pertinent to individual sounds (notes). As similarly to the note events, the note data contains information pertinent to "belonging track", "reproduction timing", "note length", "sound pitch", "velocity", and the like (not shown). Note that "note number" in FIG. 17 is shown for convenience's sake in order to facilitate understanding of the below description. The note data may further contain, if needed, information (information specified by other MIDI events), which is not contained in the note events, such as "track volume" indicating a volume for each of the tracks, "expression" indicating a relative volume among the tracks, "effect send" indicating a degree to which an effect such as reverb is exerted, and the like. In addition, the note data also contains information pertinent to "belonging chord" indicating which chord a note corresponding to the note data belongs to. An entity of the "belonging chord" is a pointer to chord data, which will be described later. Note that in the present embodiment, a group of one or more notes which are substantially simultaneously sounded in each of the tracks is treated as a "chord". In other words, even a note which is not substantially simultaneously sounded together with any of other notes is also treated as one "chord" for convenience's sake. For example, in an example shown in FIG. 17, a chord W1 is composed of notes N1 and N2 and a chord W2 is composed of a note N3 alone.

In the present embodiment, by treating music as a series of "chords", for example, processing of obtaining a sound pitch of a note ("chord") which is to be played next to a currently played note ("chord") or processing of obtaining a note length of a note ("chord") which is to be played two notes behind a currently played note ("chord") is facilitated. Information pertinent to the "chord" is stored as chord data. The cord data will be later described in detail.

The note data is temporarily stored in the note pool 123 as described above. In the present embodiment, the note pool 123 is a ring buffer. When the note pool 123 is filled with the note data and thereafter, new note data is stored, the oldest note data is deleted to secure a free storage space and thereafter, the new note data is stored in the free storage space.

As described above, the information pertinent to a note generated in the prior read reproduction is retained as the note data for a certain period of time. Therefore, for example, when information pertinent to notes played in a period during which a part from a currently played position to a position two bars ahead of the currently played position is being played is tried to be obtained, it is only required to simply read out the note data from the note pool 123 without necessitating complicated processing in which note events corresponding to notes are extracted from a plurality of note events contained in the MIDI data 126 based on reproduction timings.

(Chord Data)

Next, with reference to FIG. 18, the chord data will be described in detail. The chord data is generated concurrently with the note data and as similarly to the note data, is temporarily retained in the storage region. A region for temporarily retaining the chord data is referred to as a "chord pool". As similarly to the note pool 123, a chord pool 124 is, for example, a storage region having a given capacity, which is set in the external main memory 12, and stores the chord data in a first-in first-out manner. Also as similarly to the note pool 123, the chord pool 124 is a ring buffer. "reproduction timing", "next chord", "previous chord", "composition note", and the like. Note that "chord number" in FIG. 18 is shown for convenience's sake in order to facilitate understanding of the below description. The chord data may further contain, if needed, other information such as a "number of composition notes" indicating the number of notes which a chord is composed of The "belonging track" indicates a track to which a chord belongs. The "reproduction timing" indicates a timing at which a chord is sounded. The "next chord" indicates a chord which is to be sounded immediately after a preceding chord has been sounded in the same track. In a case where chord data corresponding to the "next chord" is not present in the chord pool 124, a value of the "next chord" is null. The "previous chord" indicates a chord which is to be sounded immediately before a succeeding chord is sounded in the same track. In a case where chord data corresponding to the "previous chord" is not present in the chord pool 124, a value of the "previous chord" is null. Entities of the "next chord" and the "previous chord" are pointers to the corresponding chord data. The "composition note" indicates one note or a plurality of notes which a chord is composed of. An entity of the "composition note" is a pointer to the corresponding note data.

By temporarily retaining in the chord pool 124 the chord data shown in FIG. 18, it can be made easy to see, for example, that a "chord" to be played next in the track 0 at the time point when 5 ticks have passed from the start of the actual reproduction is a chord W5 and a chord to be thereafter played next is a chord W8. In addition, by referring to the corresponding note data within the note pool 123 based on the information pertinent to the "composition note" in the chord data, it can be made easy to acquire information such as a sound pitch and a note length of each of notes, for example, which a chord W8 is composed of (here, notes N9 and N10).

(Track Data)

In the present embodiment, in order to generate the chord data, information pertinent to "latest chord" for each of the tracks is stored as track data 125 as shown in FIG. 19. The "latest chord" indicates a newest chord (i.e., a chord which has been reproduced last in the non-sounding manner) among chords which have been reproduced in the non-sounding manner. An entity of the "latest chord" is a pointer to the corresponding chord data. Note that shown in FIG. 19 is an example of the track data 125 obtained immediately after the reproduction of a part of music corresponding to the score shown in FIG. 10 has been finished. A specific method of utilizing the track data will be described later.

As described above, according to the present embodiment, the information pertinent to the notes to be generated behind the currently played position in the actual reproduction can be easily obtained. Thus, processing, for example, in which in the actual reproduction, a timbre of a note to be currently played is changed in accordance with a pitch of a note to be played next or a length of a note to be currently played is changed in accordance with a time period from when the note to be currently played is played to when a note to be played next is played can be made easy, though conventionally difficult. Hereinafter, a variety of applications of the music playing processing according to the present embodiment will be described.

(Application 1)

An application 1 is an example in which in the midst of reproducing music based on MIDI data 126, a score of a part from a currently played position to a position two bars ahead of the currently played position is displayed on a screen. Hereinafter, with reference to FIGS. 20 through 24, a flow of processing performed by a CPU 10 based on a music playing program 121 in the application 1 will be described.

Figure 20:
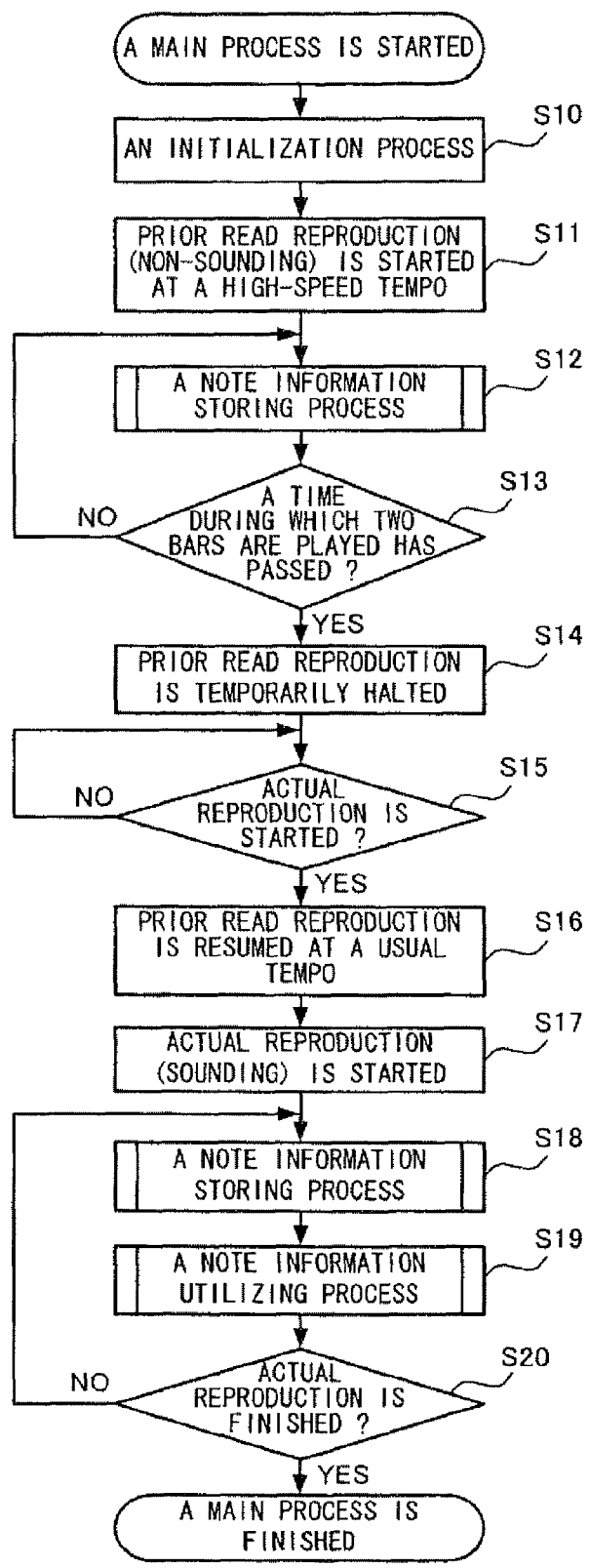
FIG. 20 is a flowchart showing a flow of a main process in an application 1.

As shown in FIG. 20, upon starting a main process in the application 1, the CPU 10 performs an initializing process at step S10. Specifically, a note pool 123, a chord pool 124, and track data 125 are cleared.

At step S11, the CPU 10 starts prior read reproduction of the MIDI data 126 at a high-speed tempo (for example, 10 times as fast as a usual tempo). The prior read reproduction is performed in a non-sounding manner (i.e., with a volume of 0).

At step S12, the CPU 10 performs a note information storing process. In the note information storing process, each time a note event is generated in the prior read reproduction, note data corresponding to this note event is added to the note pool 123. Hereinafter, with reference to FIG. 21, this note information storing process will be described in detail.

Figure 21:
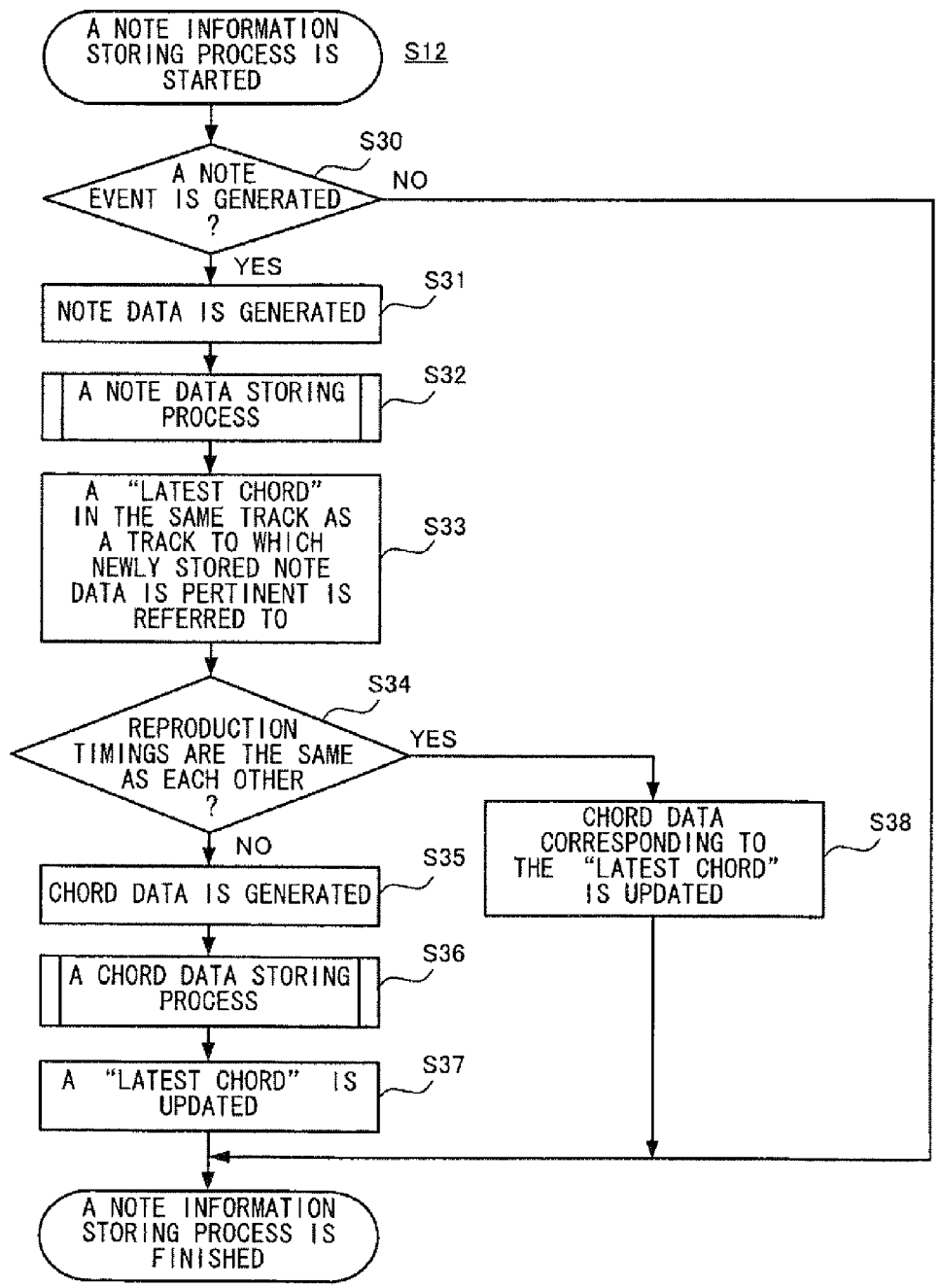
FIG. 21 is a flowchart showing a note information storing process in detail.

As shown in FIG. 21, upon starting the note information storing process, the CPU 10 determines at step S30 whether a note event is generated in the prior read reproduction. When the note event is generated, the CPU proceeds to step S31 and when the note event is not generated, the CPU finishes the note information storing process.

At step S31, the CPU 10 generates note data based on the generated note events.

At step S32, the CPU 10 performs a note data storing process. In the note data storing process, the newly generated note data is stored in the note pool 123. Hereinafter, with reference to FIG. 22, this note data storing process will be described in detail.

Figure 22:
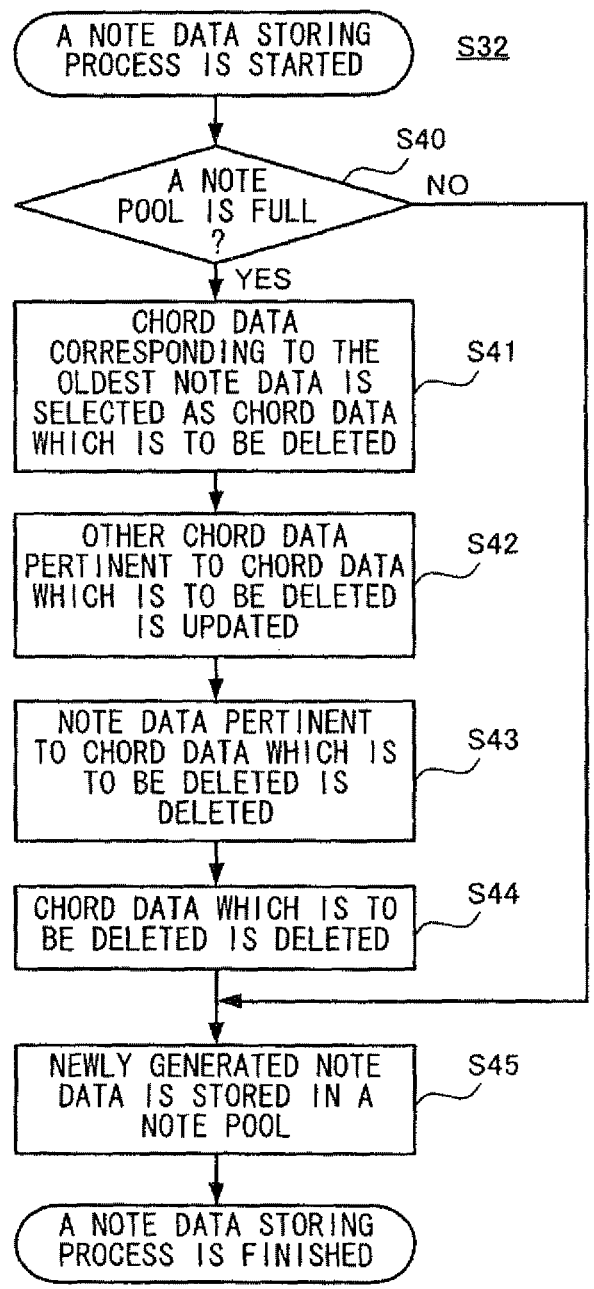
FIG. 22 is a flowchart showing a note data storing process in detail.

As shown in FIG. 22, upon starting the note data storing process, the CPU 10 determines at step S40 whether the note pool 123 is full. When the note pool 123 is full, the CPU proceeds to step S41, and when the note pool 123 is not full, the CPU proceeds to step S45.

At step S41, the CPU 10 selects a piece of chord data corresponding to the oldest piece among pieces of the note data stored in the note pool 123 as a piece of the chord data, which is to be deleted. As described above, since in the present embodiment, the note pool 123 is the ring buffer, a piece of the note data, which has been stored in a region in which a newly generated piece of the note data is to be written, is the oldest piece of the note data. A piece of the chord data, which is indicated by the "belonging chord" of the oldest piece of the note data is selected as the piece of the chord data, which is to be deleted.

At step S42, the CPU 10 updates another piece of chord data, which is pertinent to the piece of chord data which is to be deleted. Specifically, a value of the "previous chord" of a piece of chord data, which is indicated by the "next chord" of the piece of chord data which is to be deleted, is altered to be null. For example, in FIG. 18, when a chord corresponding to the piece of chord data which is to be deleted is a chord W1, a value of the "previous chord" in the chord data, corresponding to a chord W5 which is a chord next to the chord W1, is altered to be null from "W1".

At step S43, the CPU 10 deletes from the note pool 123 a piece of the note data, which is pertinent to the piece of the chord data which is to be deleted. Specifically, the piece of the note data, which is indicated by the "composition note" of the piece of the chord data which is to be deleted is deleted from the note pool 123. For example, in FIG. 18, when a chord corresponding to the piece of chord data which is to be deleted is a chord W1, pieces of the note data corresponding to the notes N1 and N2, of which the chord W1 is composed, are deleted from the note pool 123.

At step S44, the CPU 10 deletes from the chord pool 124 the chord data, which is to be deleted.

At step S45, the CPU 10 stores the newly generated note data (i.e., the note data generated at step S31) in the note pool 123 and finishes the note data storing process.

Referring back to FIG. 21, upon finishing the note data storing process at step S32, the CPU proceeds to step S33.

At step S33, the CPU 10 refers to the "latest chord" in the same track as that to which the note data (i.e., the note data generated at step S31) newly stored in the note pool 123 as the track data 125 is pertinent.

At step S34, the CPU 10 determines whether a timing at which the note data (i.e., the note data generated at step S31) newly stored in the note pool 123 is reproduced and a timing at which the chord data, indicated by the "latest chord" in the same track as that to which the note data is pertinent, is reproduced, are the same as each other. When these timings are different from each other, the CPU proceeds to step S35, and when these timings are the same each other, the CPU proceed to step S38. Note that when these timings are only slightly different from each other (in other words, when a difference between these timings is equal to or less than a predetermined number of ticks), these timings may be deemed to be the same as each other.

At step S35, the CPU 10 newly generates chord data (in other words, chord data in which a note corresponding to the newly stored note data is a "composition note") corresponding to the note data (i.e., the note data generated at step S31) newly stored in the note pool 123.

At step S36, the CPU 10 performs a chord data storing process. In the chord data storing process, the newly generated chord data is stored in the chord pool 124.

Hereinafter, with reference to FIG. 23, this chord data storing process will be described in detail.

Figure 23:
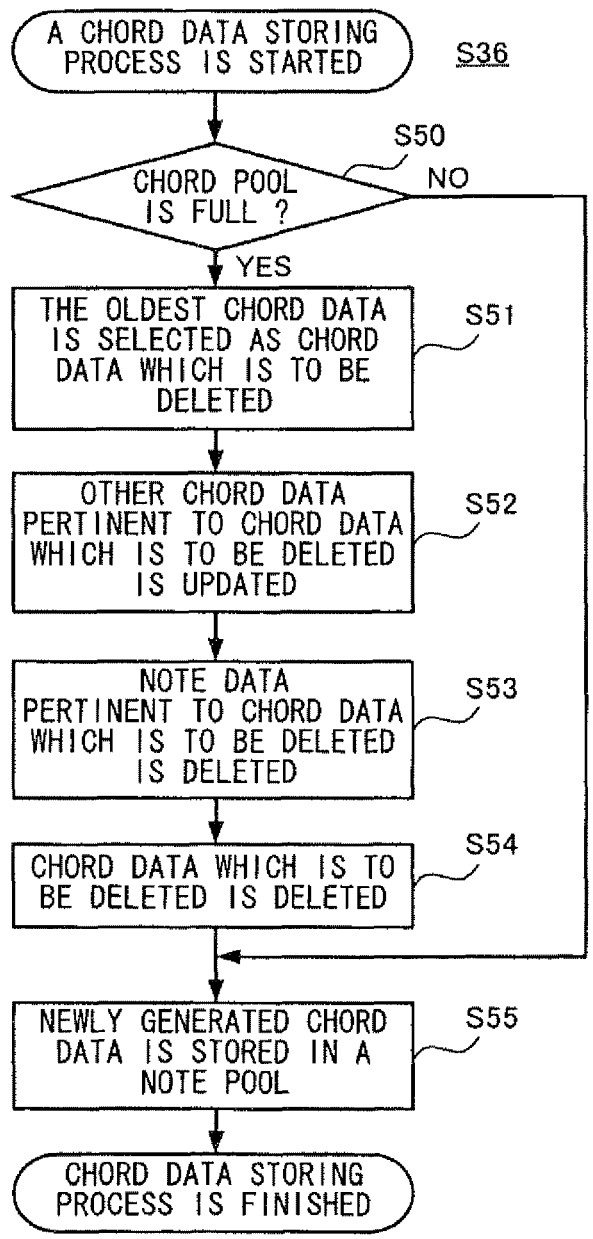
FIG. 23 is a flowchart showing a chord data storing process in detail.

As shown in FIG. 23, upon starting the chord data storing process, the CPU 10 determines at step S50 whether the chord pool 124 is full. When the chord pool 124 is full, the CPU proceeds to step S51, and when the chord pool 124 is not full, the CPU proceeds to step S55.

At step S51, the CPU 10 selects, as a piece of chord data which is to be deleted, the oldest piece of chord data among pieces of chord data stored in the chord pool 124. As described above, since in the present embodiment, the chord pool 124 is the ring buffer, a piece of the chord data, which has been stored in a region in which a newly generated piece of the chord data is to be written, is the oldest piece of the chord data.

At step S52, the CPU 10 updates another piece of chord data, which is pertinent to the piece of chord data which is to be deleted. This process is the same as that at step S42 in FIG. 22 described above.

At step S53, the CPU 10 deletes from the note pool 123 a piece of the note data, which is pertinent to the piece of the chord data which is to be deleted. This process is the same as that at step S43 in FIG. 22 described above.

At step S54, the CPU 10 deletes from the chord pool 124 the chord data which is to be deleted. This process is the same as that at step S44 in FIG. 22 described above.

At step S55, the CPU 10 stores the newly generated chord data (i.e., the chord data generated at step S35) in the chord pool 124 and finishes the chord data storing process.

Referring back to FIG. 21, upon finishing the chord data storing process at step S36, the CPU proceeds to step S37.

At step S37, the CPU 10 updates, in the track data 125, the "latest chord" in the same track as that to which the newly generated chord data (i.e., the chord data generated at step S35) is pertinent. Specifically, a value of the "latest chord" in the same track as that to which the newly generated chord data is pertinent is altered such that the "latest chord" in the same track as that to which the newly generated chord data is pertinent indicates the newly generated chord data.

At step S38, the CPU 10 updates, in the track data 125, the chord data indicated by the "latest chord" in the same track as that to which the newly generated note data (i.e., the note data generated at step S31) is pertinent. Specifically, a value of a "composition note" of the "latest chord" in the same track as that to which the newly generated note data is pertinent is altered such that the "composition note" indicates the newly generated note data. Thereafter, the CPU finishes the note information storing process.

Returning back to FIG. 20, upon finishing the note information storing process at step S12, the CPU proceeds to step S13.

At step S13, the CPU 10 determines whether a time during which two bars are played has passed. When the time during which the two bars are played has passed, the CPU proceeds to step S14, and when the time during which the two bars are played has not passed, the CPU returns to step S12.

At step S14, the CPU 10 temporarily halts the prior read reproduction. Here, the CPU 10 temporarily halts the prior read reproduction at a time point when the time during which the two bars are played has passed. However, in a case where a spare storage capacity is left, the CPU may temporarily halt the prior read reproduction after more time (for example, a time during which three bars are played) than the time during which the two bars are played has passed. Furthermore, the CPU may temporarily halt the prior read reproduction at a time point when the note pool 123 or the chord pool 124 becomes full.

At step S15, the CPU 10 determines whether to start the actual reproduction. When the actual reproduction should be started, the CPU proceeds to step S16, and when the actual reproduction should not be started, the CPU waits until a timing at which the actual reproduction should be started comes. Here, the "timing at which the actual reproduction should be started" is when a predetermined condition is satisfied, and for example, is when a player presses a specific switch provided on the controller 7.

At step S16, the CPU 10 resumes the prior read reproduction of the MIDI data 126, which has been temporarily halted, at a usual tempo (i.e., the same tempo as that of the actual reproduction).

At step S17, the CPU 10 starts the actual reproduction of the MIDI data 126. Thus, the prior read reproduction and the actual reproduction of the MIDI data 126 are concurrently performed.

At step S18, the CPU 10 performs a note information storing process. This process is the same as that performed at step S12 described above.

At step S19, the CPU 10 performs a note information utilizing process. In the note information utilizing process, a predetermined process (here, a process of displaying a score) is performed by utilizing the chord data stored in the chord pool 124 and the note data stored in the note pool 123. Hereinafter, with reference to FIG. 24, the note information utilizing process in the application 1 will be described in detail.

Figure 24:
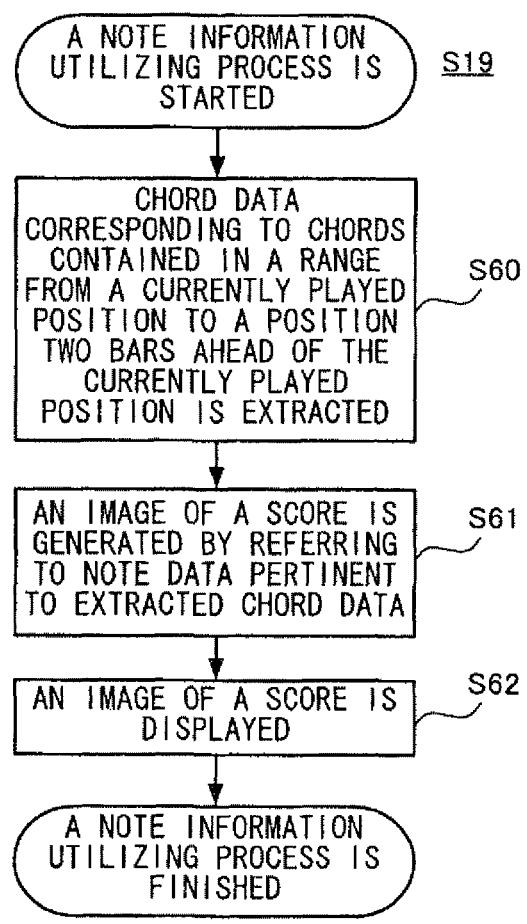
FIG. 24 is a flowchart showing a note information utilizing process in the application 1 in detail.

As shown in FIG. 24, upon starting the note information utilizing process, at step S60, the CPU 10 extracts, from the chord pool 124, chord data corresponding to chords contained in a range from a currently played position to a position two bars ahead of the currently played position. The corresponding chord data can be extracted by referring to the "reproduction timing" in the chord data.

At step S61, the CPU 10 generates an image of a chord data by referring to note data pertinent to the extracted chord data. Specifically, the image of the score is generated by referring to note data corresponding to a note indicated by the "composition note" in the extracted chord data.

At step S62, the CPU 10 outputs the generated image of the score to the screen of the television 2 and finishes the note information utilizing process.

Referring back to FIG. 20, upon finishing the note information utilizing process at step S19, the CPU proceeds to step S20.

At step S20, the CPU 10 determines whether the actual reproduction has been finished. When the actual reproduction has been finished, the CPU finishes the main process in the application 1, and when the actual reproduction has not been finished, the CPU returns to step S18. Note that the prior read reproduction is finished prior to finishing the actual reproduction.

As described above, in the application 1, it is made possible to generate the image of the score based on the MIDI data without preparing special data for generating an image of a musical score.

(Application 2)

An application 2 is an example in which when reproducing music based on MIDI data 126, a player is caused to press a predetermined switch on the controller 7 at a given timing (here, a break of bars); when the player can press the switch at a correct timing, the music is normally reproduced; and when the player cannot press the switch at the correct timing, the music is reproduced by performing shifts among tracks.

Hereinafter, with reference to FIG. 25 through FIG. 28, a flow of processing performed by the CPU 10 based on the music playing program 121 in the application 2 will be described.

Figure 25:
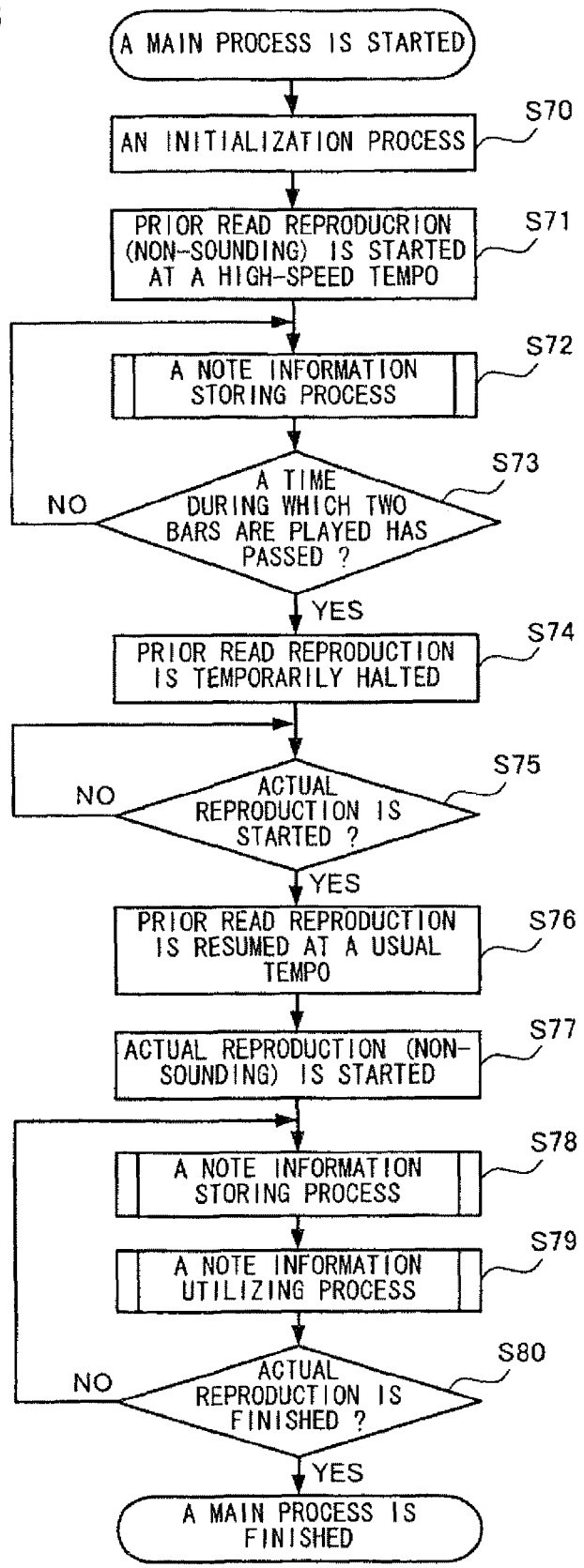
FIG. 25 is a flowchart showing a flow of a main process in an application 2.

In FIG. 25, since processes at step S70 through step S76 are the same as those at step S10 through step S16, descriptions thereof will be omitted.

At step S77, the CPU 10 starts actual reproduction of MIDI data 126. Here, as similarly to prior read reproduction, the actual reproduction is performed with a volume of 0. In the application 2, sound is generated at step S95 in FIG. 26 described later.

At step S78, the CPU 10 performs a note information storing process. This process is the same as that at step S72 (in other words, the same as that at step S12 in FIG. 20 in the application 1).

At step S79, the CPU 10 performs a note information utilizing process. In the note information utilizing process, a predetermined process (here, a process in which a note is played by shifting a reproduction timing for each of the tracks) is performed by utilizing chord data stored in the chord pool 124 and note data stored in the note pool 123. Hereinafter, with reference to FIG. 26, the note information utilizing process in the application 2 will be described in detail.

Figure 26:
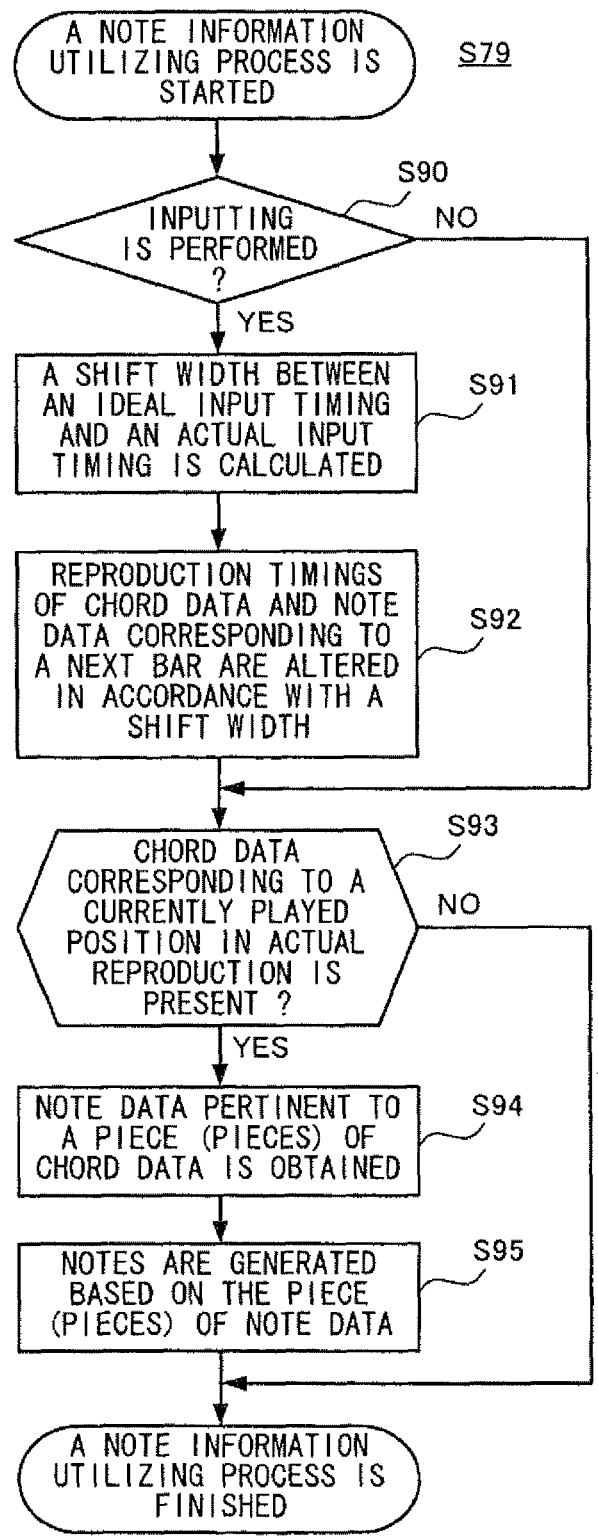
FIG. 26 is a flowchart showing a note information utilizing process in the application 2 in detail.

As shown in FIG. 26, upon starting the note information utilizing process, the CPU 10 determines at step S90 whether a predetermined signal (for example, a signal indicating that the predetermined switch on the controller 7 is pressed down, or a signal indicating that the controller 7 is swung) has been inputted. When the predetermined signal has been inputted, the CPU proceeds to step S91, and when the predetermined signal has not been inputted, the CPU proceeds to step S93.

At step S91, the CPU 10 calculates a shift width between an ideal input timing (here, a break of bars) and an actual input timing (for example, the number of ticks).

At step S92, the CPU 10 alters, in accordance with the calculated shift width, "reproduction timings" of chord data and note data corresponding to bars behind a currently played position in the actual reproduction. Hereinafter, one example of a method of altering the "reproduction timings" will be described with reference to FIG. 27 and FIG. 28.

Figure 27:
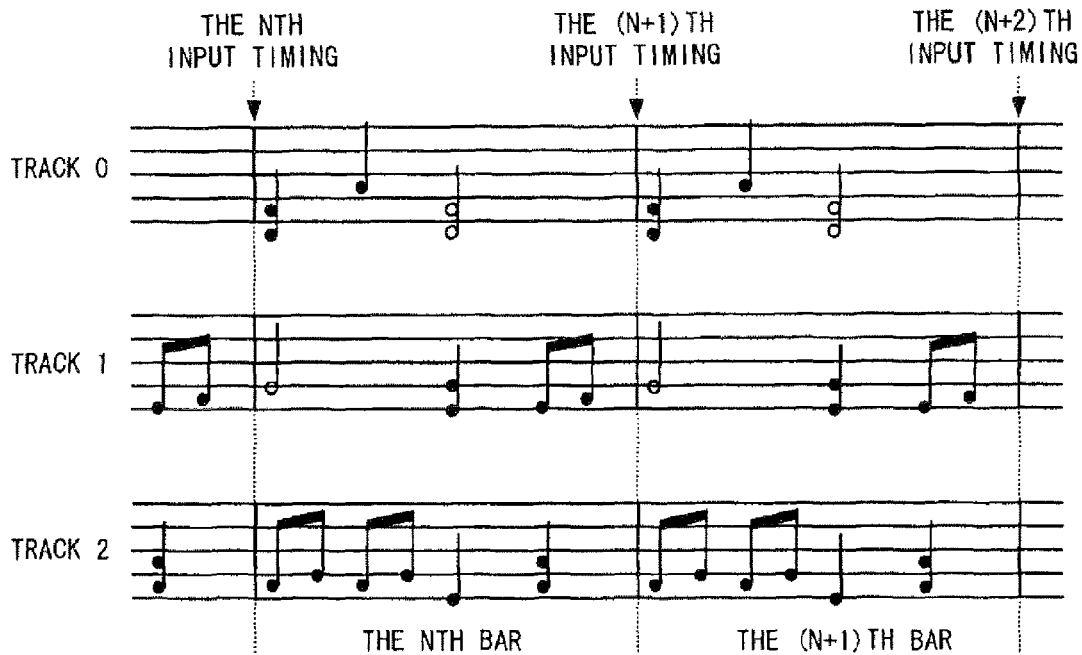
FIG. 27 is a diagram illustrating processing in the application 2.
Figure 28:
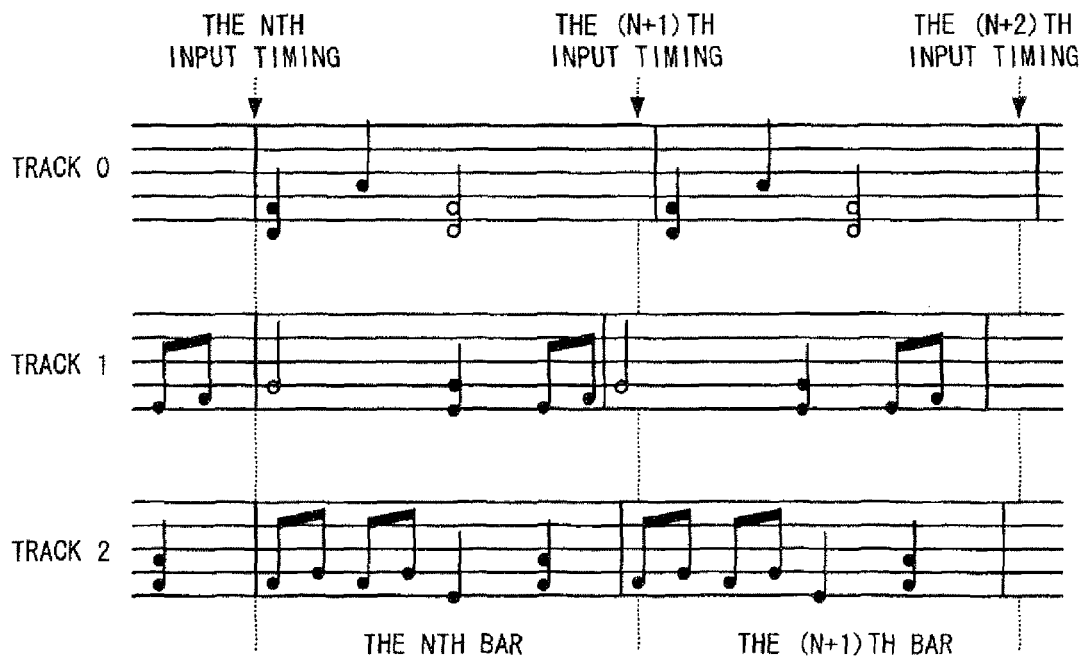
FIG. 28 is a diagram illustrating the processing in the application 2.

FIG. 27 is a diagram showing the ideal input timing. In the application 2, a player is set to a task of performing a predetermined operation (for example, an operation of pressing a predetermined switch on the controller 7) at positions of breaks of bars ("the Nth input timing", "the (N+1)th input timing" and "the (N+2)th input timing" in FIG. 27) at good timing. For example, when the player performs the predetermined operation at a starting position of the Nth bar (i.e., the Nth input timing) or around a periphery thereof, a shift width between the Nth input timing which is the ideal input timing and an actual input timing is calculated, and in accordance with this shift width, reproduction timings of notes in the (N+1)th bar are shifted forward or backward for respective tracks as shown in FIG. 28.

Note that it is randomly determined for each of the tracks whether the reproduction timing is advanced or delayed. An upper limit value of a shift amount (absolute value) of the reproduction timing is determined so as to increase in accordance with the shift width between the ideal input timing and the actual input timing, and an actual shift amount is randomly determined for each of the tracks. In other words, when the Nth input timing and an actual input timing corresponding thereto completely coincide, the (N+1)th bar is normally played according to a score (in other words, without losing mutual coincidences of the reproduction timings of the (N+1)th bar among the tracks). However, when a shift width between the Nth input timing and an actual input timing corresponding thereto is increased, the (N+1)th bar is awkwardly played (in other words, with the reproduction timings of the (N+1)th bar among the tracks being greatly shifted from one another) in accordance with the increase in the shift width.

Other bars are played in a similar manner. For example, in accordance with a shift width between the (N+1)th input timing and an actual input timing corresponding thereto, reproduction timings of notes in the (N+2)th bar are altered.

At step S93, the CPU 10 determines whether chord data (i.e., chord data in which a "reproduction timing" is at a currently played position) corresponding to a currently played position (indicated by the number of ticks) in the actual reproduction (in the non-sounding manner) is present in the chord pool 124. When the chord data corresponding to the currently played position is present, the CPU proceeds to step S94, and when the chord data corresponding to the currently played position is not present, the CPU finishes the note information utilizing process in the application 2.

At step S94, the CPU 10 obtains (in other words, extracts), from the note pool 123, note data pertinent to the chord data (one piece or a plurality of pieces) corresponding to the currently played position. Specifically, note data indicated by the "composition note" of the corresponding chord data is obtained from the note pool 123.

At step S95, the CPU 10 generates notes based on the obtained note data and finishes the note information utilizing process in the application 2. The notes generated here are based on the note data whose "reproduction timings" have been altered as necessary at step S92.

Referring back to FIG. 25, upon finishing the note information utilizing process at step S79, the CPU proceeds to step S80.

At step S80, the CPU 10 determines whether the actual reproduction has been finished. When the actual reproduction has been finished, the CPU finishes the main process in the application 2, and when the actual reproduction has not been finished, the CPU returns to step S78. Note that the prior read reproduction is finished prior to finishing the actual reproduction.

As described above, in the application 2, it is made possible to alter the reproduction timings of the notes contained in music in accordance with the player's operation or the like. In particular, in the conventional art, when MIDI data is reproduced, it is extremely difficult to play only notes in a part of tracks at timings earlier than original reproduction timings. However, according to the present embodiment, the above-described processing easily enables this difficult reproduction.

In the application 2, the reproduction timings are shifted in accordance with the shift width between the ideal input timing and the actual input timing. However, as a modified example, music parameters (for example, pitches, timbre, etc.) other than the reproduction timings may be altered in accordance with the shift width between the ideal input timing and the actual input timing. As a further modified example, in a case where a plurality of players are at play, reproduction timings or the like may be altered in accordance with a shift width between timings of inputting performed by the players.

In addition, in the application 2, the reproduction timings of a part of music (one bar) are shifted in accordance with the shift width between the ideal input timing and the actual input timing. However, as a modified example, in accordance with a shift width between an ideal input timing and an actual input timing at a certain time point, note information pertinent to a whole remaining part which succeeds after the certain time point may be altered (in other words, note data and chord data which have not yet been stored in the note pool 123 and the chord pool 124 at the time point may be altered appropriately at a time point when these pieces of data have been stored in the note pool 123 and the chord pool 124).

(Application 3)

An application 3 is an example in which while music is being played based on MIDI data 126, a length of each of notes in the music is altered in accordance with a strength with which a player swings the controller 7. For example, when the player is swinging the controller 7 in a comparatively strong manner, a length of a note, which is being played at that time, is altered to be "((a reproduction timing of a note next to the note which is being played at that time)−(a reproduction timing of the note which is being played at that time))×0.3". When the player is swinging the controller 7 in a comparatively weak manner, a length of a note, which is being played at that time, is altered to be "((a reproduction timing of a note next to the note which is being played at that time)−(a reproduction timing of the note which is being played at that time))×0.6". Also in this case, in the present embodiment, the "reproduction timing of the next note" can be easily obtained by referring to the note pool 123 and the chord pool 124.

Note that the strength with which the controller 7 is swung can be detected, for example, based on an output signal from the acceleration sensor 701 provided on the controller 7. Instead of the strength with which the controller 7 is swung, other parameter (for example, a speed of rotating the controller 7, a strength with which a specific switch is pressed, etc.) may be used.

(Application 4)

An application 4 is an example in which while music is being played based on MIDI data 126, a note having a pitch which is intermediate between a pitch of a note played immediately before and a pitch of a note played next is generated when a player presses a predetermined button on the controller 7 at a given timing. Also in this case, in the present embodiment, the "pitch of the next played note" can be easily obtained by referring to the note pool 123 and the chord pool 124.

Although in the present embodiment, the example in which the music is played based on the MIDI data 126 is described, the present invention is not limited thereto. Needless to say, the present invention is applicable to music data in other format, which has properties similar to those of the MIDI data 126.

In addition, although in the present embodiment, the example in which the note data generated based on the note events generated in the prior read reproduction is stored in the note pool 123 is described, the present invention is not limited thereto. The note events generated in the prior read reproduction may be stored as they are in the note pool 123. In addition, although in the present embodiment, the example in which the chord data is stored in the chord pool 124 is described, storing the chord data is not indispensable in the present invention.

In addition, although in the present embodiment, the example in which the note pool 123 and the chord pool 124 are the ring buffers is described, the present invention is not limited thereto.

In addition, although in the present embodiment, the example in which the note data of the tracks which differ from one another is stored in the same ring buffer (note pool 123) is described, the present invention is not limited thereto and a ring buffer may be provided for each of the tracks. However, in this case where the ring buffer is provided for each of the tracks, since the number of notes contained in music differs among the tracks, a situation in which a frequency of adding the note data in only a part of the ring buffers is extremely low may easily occur, thereby leading to a problem of worsening an efficiency of utilizing the storage region. Accordingly, in terms of enhancing the efficiency of utilizing the storage region, it is preferable that as in the present embodiment, the note data of the tracks which differ from one another is stored in the same ring buffer. The same applies to the chord pool 124.

While the invention has been described in detail, the foregoing description is in all aspects illustrative and not restrictive. It is understood that numerous other modifications and variations can be devised without departing from the scope of the invention.

The invention claimed is:

1. A non-transitory computer-readable storage medium having stored therein a music playing program executed by a music playing apparatus for playing music by reproducing music data containing information pertinent to pitches of notes which the music is composed of and reproduction timing information, the music playing program causing a computer in the music playing apparatus to execute at least:

starting non-sounding reproduction processing in which the music data is reproduced in a non-sounding manner based on a music data reproduction library having a function of reproducing the music data with any volume;

sequentially storing, in a note information storage region, note information pertinent to notes reproduced in the non-sounding manner each time each of the notes which the music is composed of is reproduced in the non-sounding manner during the non-sounding reproduction processing;

starting sounding reproduction processing, in which the music data is reproduced in a sounding manner based on the music data reproduction library after the non-sounding reproduction processing has been started, such that sounding reproduction is performed in parallel with non-sounding reproduction; and performing, during the sounding reproduction processing, information processing which utilizes the note information stored in the note information storage region.

2. The storage medium according to claim 1, wherein the music playing program causes the computer to further execute temporarily making a speed at which the music is reproduced in the non-sounding reproduction processing faster than a speed at which the music is reproduced in the sounding reproduction processing.

3. The storage medium according to claim 2, wherein the speed at which the music is reproduced in the non-sounding reproduction processing is made faster than the speed at which the music is reproduced in the sounding reproduction processing in a time period from when the non-sounding reproduction processing is started to when the sounding reproduction processing is started, and the speed at which the music is reproduced in the non-sounding reproduction processing is made same as the speed at which the music is reproduced in the sounding reproduction processing after the sounding reproduction processing has been started.

4. The storage medium according to claim 1, wherein the non-sounding reproduction processing is a process in which the music data is reproduced with a volume of 0 by utilizing a music data reproduction library having a function of reproducing the music data with any volume.

5. The storage medium according to claim 1,
wherein the note information storage region is a storage region having a given capacity, which is set in a memory unit, and
wherein, when the note information storage region is full, the note information is stored in the note information storage region in a first-in first-out manner.

6. The storage medium according to claim 5, wherein the note information storage region is a ring buffer.

7. The storage medium according to claim 1, wherein the music playing program causes the computer to further execute:
temporarily halting, after the non-sounding reproduction processing has been started, the non-sounding reproduction processing before the sounding reproduction processing is started; and
resuming the non-sounding reproduction processing when the sounding reproduction processing is started.

8. The storage medium according to claim 1, wherein the music data is MIDI data.

9. The storage medium according to claim 8, wherein the music playing program causes the computer to further execute, when in the non-sounding reproduction processing, a plurality of notes are simultaneously outputted in any of tracks defined in the MIDI data, chord data in which the simultaneously outputted plurality of notes are associated with one another as a group is generated and stored in a chord data storage region.

10. The storage medium according to claim 9, wherein the music playing program causes the computer to further execute:
storing, as track data, latest chord data in each of the tracks among the chord data stored in the chord data storage region;
determining, each time any of notes is reproduced in the non-sounding reproduction processing, whether or not chord data, which is pertinent to a same track as a track having the reproduced note therein and whose reproduction timing is a same as a timing at which the note is reproduced, is stored as the track data; and
associating the reproduced note with the chord data which is pertinent to the same track as the track having the reproduced note therein and whose reproduction timing is the same as the timing at which the note is reproduced when the chord data is stored as the track data.

11. The storage medium according to claim 1,
wherein the music playing apparatus includes a display unit, and
wherein, during the sounding reproduction processing, an image of a score is generated based on the note information stored in the note information storage region and is outputted to the display unit.

12. The storage medium according to claim 1,
wherein the music playing apparatus includes an input unit,
wherein the music playing program causes the computer to further execute detecting an input from the input unit during the sounding reproduction processing,
wherein performing, during the sounding reproduction processing, information processing which utilizes the note information stored in the note information storage region includes:
calculating a shift width between a detected timing of the input from the input unit and an ideal input timing based on the music data; and
altering, based on the calculated shift width calculated, a part or all of the note information stored in the note information storage region, and
wherein starting sounding reproduction processing includes generating notes based on the altered note information.

13. The storage medium according to claim 12,
wherein the note information contains at least the reproduction timing information, and
wherein the reproduction timing information contained in the note information stored in the note information storage region is altered based on the calculated shift width.

14. The storage medium according to claim 12, wherein an altering amount of the note information is increased in accordance with an increase in the calculated shift width.

15. The storage medium according to claim 1,
wherein the music playing apparatus includes an input unit having an operation strength detection function,
wherein the note information contains at least note length information of each of the notes,
wherein the music playing program causes the computer to further execute detecting an operation strength exerted on the input unit during the sounding reproduction processing, and
wherein the note length information contained in the note information stored in the note information storage region is altered based on the detected operation strength exerted on the input unit.

16. A music playing apparatus for playing music by reproducing music data containing information pertinent to pitches of notes which the music is composed of and reproduction timing information, comprising:
a processor; and
a memory coupled to said processor, said memory storing instructions that, when executed by said processor, control said processor to:
start non-sounding reproduction processing in which the music data is reproduced in a non-sounding manner based on a music data reproduction library having a function of reproducing the music data with any volume;
sequentially store, in a note information storage region, note information pertinent to notes reproduced in the non-sounding manner each time each of the notes which the music is composed of is reproduced in the non-sounding manner during the non-sounding reproduction processing;
start sounding reproduction processing, in which the music data is reproduced in a sounding manner based on the music data reproduction library after the non-sounding reproduction processing has been started, such that sounding reproduction is performed in parallel with non-sounding reproduction; and
perform, during the sounding reproduction processing, information processing which utilizes the note information stored in the note information storage region.

17. A music playing method executed by a music playing apparatus for playing music by reproducing music data containing information pertinent to pitches of notes which the music is composed of and reproduction timing information, the method comprising:
starting non-sounding reproduction processing in which the music data is reproduced in a non-sounding manner based on a music data reproduction library having a function of reproducing the music data with any volume;
sequentially storing, in a note information storage region, note information pertinent to notes reproduced in the non-sounding manner each time each of the notes which the music is composed of is reproduced in the non-sounding manner during the non-sounding reproduction processing;

starting sounding reproduction processing, in which the music data is reproduced in a sounding manner based on the music data reproduction library after the non-sounding reproduction processing has been started, such that sounding reproduction is performed in parallel with non-sounding reproduction; and performing, during the sounding reproduction processing, information processing which utilizes the note information stored in the note information storage region.

18. A music playing system for playing music by reproducing music data containing information pertinent to pitches of notes which the music is composed of and reproduction timing information, comprising:

a processor; and a memory coupled to said processor, said memory storing instructions that, when executed by said processor, control said processor to:

start non-sounding reproduction processing in which the music data is reproduced in a non-sounding manner based on a music data reproduction library having a function of reproducing the music data with any volume;

sequentially store, in a note information storage region, note information pertinent to notes reproduced in the non-sounding manner each time each of the notes which the music is composed of is reproduced in the non-sounding manner during the non-sounding reproduction processing;

start sounding reproduction processing, in which the music data is reproduced in a sounding manner based on the music data reproduction library after the non-sounding reproduction processing has been started, such that sounding reproduction is performed in parallel with non-sounding reproduction; and perform, during the sounding reproduction processing, information processing which utilizes the note information stored in the note information storage region.

* * * * *